(12) United States Patent
Poplawski

(10) Patent No.: US 11,555,674 B2
(45) Date of Patent: *Jan. 17, 2023

(54) DAZZLING SYSTEM COUPLED TO A CAMERA MOUNTED IN A FIXED LOCATION

(71) Applicant: Daniel Poplawski, Oswego, IL (US)

(72) Inventor: Daniel Poplawski, Oswego, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,307

(22) Filed: Aug. 27, 2021

(65) Prior Publication Data
US 2021/0389103 A1  Dec. 16, 2021

Related U.S. Application Data

(63) Continuation of application No. 16/843,513, filed on Apr. 8, 2020, now Pat. No. 11,131,528, which is a continuation-in-part of application No. 16/382,290, filed on Apr. 12, 2019, now Pat. No. 10,712,131.

(60) Provisional application No. 62/900,455, filed on Sep. 13, 2019, provisional application No. 62/657,291, filed on Apr. 13, 2018.

(51) Int. Cl.
*F41H 13/00* (2006.01)
*H04N 7/18* (2006.01)
*G08B 25/10* (2006.01)
*G06N 20/00* (2019.01)

(52) U.S. Cl.
CPC ......... *F41H 13/0056* (2013.01); *G08B 25/10* (2013.01); *H04N 7/181* (2013.01); *G06N 20/00* (2019.01)

(58) Field of Classification Search
CPC .................................................. F21H 13/0056
See application file for complete search history.

(56) References Cited

U.S. PATENT DOCUMENTS 7,040,780 B2 * 5/2006 Diehl .................. F41H 13/0056
362/86

* cited by examiner

*Primary Examiner* — Vip Patel
(74) *Attorney, Agent, or Firm* — The Law Offices of Konrad Sherinian, LLC

(57) ABSTRACT

A non-lethal dazzling turret includes a laser operable in the visible spectrum. The non-lethal dazzling turret can be deployed, for example, behind a counter at a convenience store or a gas station, and can include a camera as well as an on-board computer. The non-lethal dazzling turret can stream video to a remote location where an operator can aim and fire the non-lethal dazzling turret at potential targets as needed. Alternatively, a fully autonomous version is disclosed that can be activated by, for example, a panic button.

22 Claims, 16 Drawing Sheets

DAZZLING SYSTEM COUPLED TO A CAMERA MOUNTED IN A FIXED LOCATION

CROSS REFERENCE TO RELATED APPLICATIONS

The present disclosure is a continuation of U.S. patent Ser. No. 16/843,513, filed on Apr. 8, 2020, on behalf of inventor of Daniel Poplawski, which is a continuation-in-part of U.S. patent application Ser. No. 16/382,290, filed on Apr. 12, 2019, which claims priority to U.S. Provisional Patent Application No. 62/657,291, which was filed on Apr. 13, 2018 on behalf of inventor Daniel Poplawski, all of which are hereby incorporated by reference in the entirety. U.S. patent application Ser. No. 16/843,513 further claims priority to U.S. Provisional Pat. App. No. 62/900,455, filed on Sep. 13, 2019, which is hereby incorporated by reference in the entirety.

FIELD OF THE DISCLOSURE

The present invention generally relates to non-lethal laser weapons, and more particularly, to the use of non-lethal lasers and non-lethal laser systems for dazzling or stunning persons. The present invention more particularly relates to a non-lethal laser weapon deployed with, and in certain cases, sharing a mount with, a camera system.

BACKGROUND

In recent years, the issue of mass shootings has risen to national prominence. In particular, publicly available data shows that there were at least 146 mass shootings in the United States between 1967 and 2017, with an average of eight fatalities (including the perpetrator); here we are using the definition of at least four or more persons shot or killed as comprising a mass shooting—other definitions result in far higher numbers of mass shootings. Numerous solutions have been proposed to lower the number of mass shootings. These solutions include, for example, banning certain firearms, raising the minimum age of a person to purchase certain firearms, or adding additional mental health requirements for the purchase of a firearm. All of these solutions require changes to the law, which, in the present political climate is far from certain. In addition, various studies appear to demonstrate that some of these solutions may not be effective.

One solution that has been proposed that would not require changing "gun laws" is adding armed guards to various "target" locations, such as schools. For example, it has been proposed to arm schoolteachers. The viability of such an approach is questionable—schoolteachers generally are not trained in the use of firearms, and the use of firearms by untrained persons may exacerbate a dangerous situation. In particular, the possibility of an untrained person accidentally harming a child will likely prevent the widespread deployment of armed schoolteachers. However, the use of a standoff non-lethal device in such a circumstance may be appropriate.

In recent years, security forces, including military and police forces, have deployed non-lethal devices in increasing numbers. For example, high intensity and laser light can present a glare that degrades vision and cause discomfort for the target. High-intensity light can also momentarily blind or dazzle the target, resulting in a temporary loss of visual sensitivity after the light source is removed, and can potentially result in disorientation and nausea. Lasers have been found to be particularly useful as a non-lethal high-intensity light device. However, lasers can also cause irreversible retinal disorder, which is banned in most cases by the Protocol on Blinding Laser Weapons. Accordingly, a balance must be struck between providing a laser that is intense enough to dazzle a hostile actor, but not intense enough to cause irreversible retinal disorder to a target.

Various guidelines including ANSI Z136.1 have been developed regarding the maximum permissible exposure to laser light that an eye can withstand without suffering irreversible retinal disorder. Generally, the maximum level of tolerable exposure is a function of the laser wavelength, laser intensity as measured in milliwatts per square centimeter ($mW/cm^2$), and the duration of the exposure. For purposes of calculating the exposure duration, the time is typically assumed to be 0.25 s; i.e., the length of time before a blink is complete.

A number of prior art dazzlers have been developed. In particular, a number of solutions have been developed for or by the United States Military. Some of these can be found in U.S. Pat. Nos. 6,142,650 and 6,431,732. Both of these detail cylindrical hand-held or pedestal mounted laser systems suitable for military use. However, these prior art systems are deficient in a number of ways. First, the use of a hand-held or pedestal mounted laser system can be difficult or inconvenient to aim. Second, the range of the prior art systems is limited, at least partially due to the difficulty in aiming. Third, the prior art systems generally require that the user of the dazzler place herself or himself in harms way. All of these are deficiencies that the present disclosure seeks to overcome.

FBI statistics for the years 2013-2017 for robberies at banks, convenience stores, and gas stations are shown below:

| Location | 2013 | 2014 | 2015 | 2016 | 2017 |
| --- | --- | --- | --- | --- | --- |
| Gas or Service Station | 8353 | 8072 | 8916 | 9708 | 9566 |
| Convenience Store | 17,103 | 17,380 | 18,661 | 20,656 | 20,967 |
| Banks | 6,512 | 5,939 | 5,961 | 5,914 | 5,420 |

These publicly accessible fixed locations often utilize a variety of crime reduction tools such as security cameras, man traps, glass partitions, and other barriers. While effective in some instances, the above numbers clearly show that criminal actions such as robberies are still occurring in unacceptable numbers.

OBJECTS OF THE DISCLOSED SYSTEMS, METHODS, AND APPARATUS

Accordingly, it is an object of this disclosure to provide a hand-held dazzler that will not cause irreversible retinal disorder to a target's eyes.

Another object of this disclosure is to provide a hand-held dazzler that can be aimed and operated by a person with minimal or no training.

Another object of this disclosure is to provide a hand-held dazzler that can be operated by aiming the dazzler at the hostile target and pressing a single button.

Another object of this disclosure is to provide a hand-held dazzler that can adjust the power level of an integrated laser to avoid causing irreversible retinal disorder to a target's eyes while allowing for a reasonable range.

Another object of this disclosure is to provide a hand-held dazzler that can adjust the power level of an integrated laser to avoid causing irreversible retinal disorder to a target's eyes while allowing for a reasonable range through the use of a manual or electronic range finder.

Another object of this disclosure is to provide a remote operated dazzler that can be used to disable a hostile actor while minimizing the risk to the remote operator.

Another object of this disclosure is to provide a remote operated dazzler that provides a large dazzling field that does not require the remote operator to precisely aim the dazzling device.

Another object of this disclosure is to provide a hand-held dazzler that can interrupt or reduce the laser output when the dazzler detects it is being moved rapidly.

Another object of this disclosure is to provide for the coupling of manual focus with low cost electronic focus confirmation to help ensure the focus distance is confirmed between the manual focus and the electronic confirmation.

Another object of this disclosure is to provide a dazzler that can be disabled remotely and require secondary authentication prior to the laser being enabled.

Another object of this disclosure is to provide a dazzler with limited profile from the emitting end, and an easy to identify shape or color when viewed from the side or top view.

Another object of this disclosure is to provide a predetermined fixed location dazzler that will not cause permanent damage to a target's eyes.

Another object of this disclosure is to provide a predetermined fixed location dazzler that can be aimed and operated automatically or remotely by a trained person at a monitoring station.

Another object of this disclosure is to provide a predetermined fixed location dazzler that can adjust the power level of an integrated laser to avoid causing permanent damage to a target's eyes while allowing for a reasonable range.

Another object of this disclosure is to provide a predetermined fixed location dazzler that can adjust the power level of an integrated laser to avoid causing permanent damage to a target's eyes while allowing for a reasonable range through the use of a co-operating range finder.

Another object of this disclosure is to provide a predetermined fixed location dazzler that can adjust the power level of an integrated laser to avoid causing permanent damage to a target's eyes while allowing for the use of an electronic range finder and automated targeting that is assisted or controlled by AI.

Another object of this disclosure is to provide a predetermined fixed location dazzler that can adjust the power level of an integrated laser to avoid causing permanent damage to a target's eyes while allowing for the use of an electronic range finder and remote operator control targeting.

Another object of this disclosure is to provide predetermined fixed location objects when the dazzler is in a predetermined non-fixed location, i.e. from a drone, airplane, train, ship, boat, automobile or other movable platform.

Another object of this disclosure is to provide a remote operated dazzler that can be used to disable a hostile actor while minimizing the risk to the on-site personnel.

Another object of this disclosure is to provide an automatically operated dazzler that provides an artificial intelligence target aiming system that does not require the operator to precisely aim the dazzling device.

Other advantages of this disclosure will be clear to a person of ordinary skill in the art. It should be understood, however, that a system, an apparatus or a method could practice the disclosure while not achieving all of the enumerated advantages, and that the protected disclosure is defined by the claims.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

Figure 1:
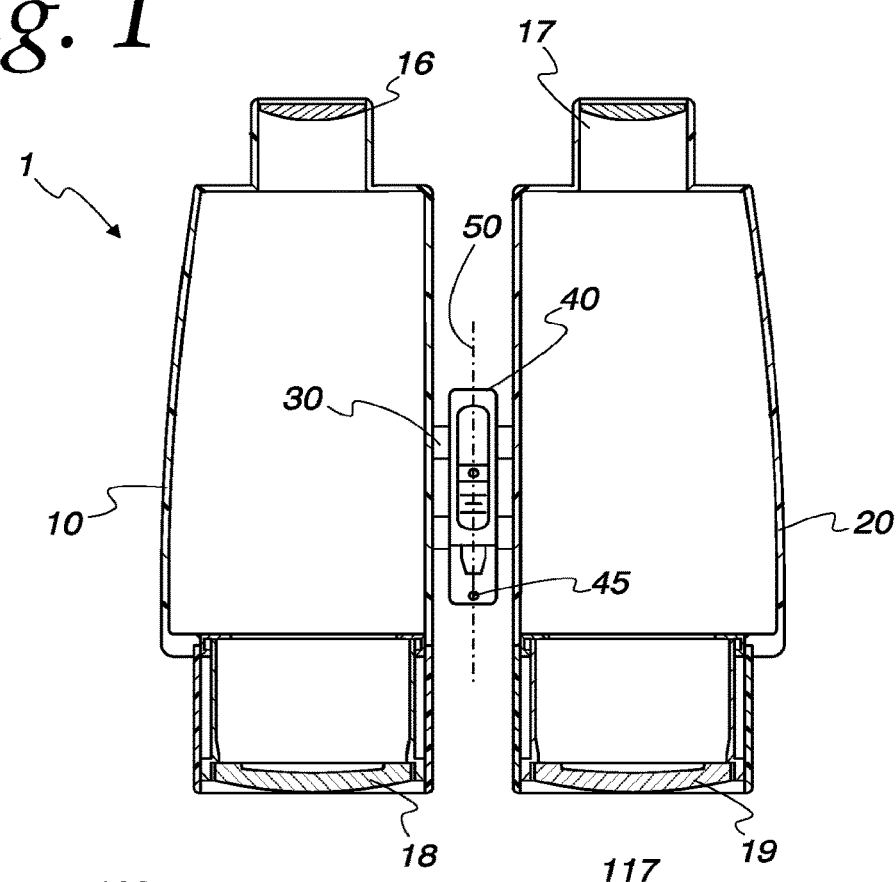
FIG. 1 is a sectional view of the underside of a non-lethal dazzling device constructed in accordance with this disclosure.

A person of ordinary skills in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

SUMMARY

Pursuant to the various embodiments, the present disclosure provides a non-lethal dazzling device. In particular, the non-lethal dazzling device comprises a housing. Disposed at a distal end of the housing is a dazzling module.

The dazzling module comprises a laser drive circuit, at least one activation mechanism, and a dazzling laser. The activation mechanism is operatively coupled to the laser drive circuit and causes the laser drive circuit to generate a suitable laser drive power, which is used to activate the dazzling laser. The dazzling laser is adapted to produce a dazzling laser beam which will dazzle a hostile actor without causing irreversible retinal disorder.

In an additional embodiment, the non-lethal dazzling device includes an on-board computer. As set forth herein, on-board computer is used broadly, and can comprise an on-board computer module, or a combination of a microprocessor or microcontroller, with local or remote support circuitry and storage including cloud-based processing. A camera is coupled to the on-board computer, and effectively serves as the "eyes" of the claimed non-lethal dazzling device. In particular, the camera produces a stream of video that includes a plurality of successive sequential frames. The on-board computer executes software that analyzes the successive video frames for motion and identifies potential targets based on changes in the successive video frames.

In an additional embodiment, the non-lethal dazzling device can further comprise at least one servo motor that is coupled to the housing and used to aim the non-lethal dazzling device. For example, the non-lethal dazzling device can include a tilt servo-motor and a pan servo-motor that can be used to adjust the aim of the camera and the dazzler, which would be mounted close to the camera to allow for precise aiming. In addition, an extend-retract servo-motor could also be used to allow the non-lethal dazzling device to articulate on three axes.

In an additional embodiment, the non-lethal dazzling device can further comprise a supplemental servo motor that is supplemental to the camera and used to aim the non-lethal dazzling device independently of the camera. For example, the non-lethal dazzling device can include a supplemental high-speed tilt servomotor and a high-speed pan servomotor that can be used to adjust the aim of the dazzler with finer control than the motors attached to the camera. For example, the co-operating camera may have an aiming resolution of ±3 degrees. The high-speed supplemental motors may allow the dazzler to be rapidly aimed at a target faster and more accurately than the motors attached directly to the camera. The supplemental motors may also serve to aim the dazzler in the case of a fixed or limited movement camera installation, where the camera is only generally pointed into an area of interest, and supplemental dazzler motors provide the accuracy necessary to provide exact dazzling laser aiming point in both pan and tilt, for example ±0.004 degrees of resolution. The servomotors may use any mechanism commonly known in the arts including encoders, DC, AC, Linear and similar technology. The movement may also be applied by technology such as stepper motors, galvanometers, mirror galvanometers, prisms, diffraction gratings and similar technology. The supplemental motion control may work in conjunction with the companion camera or independently, the non-lethal dazzling device may be mounted to the camera, or independent, depending on the needs of the particular installation and the required accuracy of the dazzling laser aiming point, for example the dazzling beam at 100 yards would have a circular dazzling laser aiming point accuracy of 1 inch in diameter.

In yet another embodiment, the non-lethal dazzling device can also include a network port coupled to the on-board computer. The network port can be a wireless port or a wired network port. Software operating on the on-board computer can interface with a remote installation, and effectively allow the remote installation to control the non-lethal dazzling device. In particular, the software can serve video to the remote installation through the network port and receive aiming and firing commands from the remote installation to aim and fire the non-lethal dazzling device.

In a separate embodiment, the non-lethal dazzling device can be fully autonomous. In such an embodiment, the device will generally be inactive, and will merely scan the environment for potential targets. However, when activated by, for example, pressing a "panic button," or monitoring for the sound of gunfire or other disturbances, the targeting and firing features of the non-lethal dazzling device can be unleashed. In this embodiment, the non-lethal dazzling device can include persistent storage that is cloud or server based or coupled to the on-board computer. The persistent storage can receive the streaming video, which will be examined by remote software or by operating on the on-board computer to track a potential target based on changes in each successive frame of video and fire the dazzling laser at the target when, for example, the targeting software confirms that the target's face has been targeted.

In a fully autonomous embodiment, the non-lethal dazzling device can also include a rangefinder and video recording to provide range information and video that will be stored on a time-stamped basis in the remote or local persistent storage. The firing module can then adjust the power to the laser drive circuit based on the range to the target. Alternatively, the video record module can record events for a time after activation, say 15 minutes, including the dazzling event(s) and subsequent actions taken by the subjects in the range of the recording system.

In a further embodiment, the fully autonomous system may work in conjunction with external monitors that provide telemetry and other data to the system, thus allowing activation based on external events. As an example, external motion detectors along a border or perimeter fence may transmit this trigger to the dazzling system. The dazzling system either remotely via a cloud decision system or at the autonomous system dazzler makes an activation decision based on this external stimulus. Depending on the external information the dazzling system then makes a pre-determined activation decision to unleash the dazzling technology.

DETAILED DESCRIPTION

Turning to the Figures and to FIG. 1 in particular, the underside of a non-lethal dazzling device 1 constructed in accordance with this disclosure is depicted. A first housing 10 is joined to a second housing 20 via a bridge 30. The embodiment of FIG. 1 does not incorporate a focal adjustment within the bridge 30; however, it does incorporate a low-powered dazzling laser 40. For example, the dazzling laser 40 can be a Class 3R laser with a power output of, for example, 2.5 milliwatts (mW). A Class 3R laser will generally not cause irreversible retinal disorder during a momentary exposure of less than 0.25 seconds at distances greater than 40 feet, which is within the aversion response; i.e., where a person turns away or blinks to avoid bright light. While a Class 3R laser will not cause retinal disorder, it generally can serve as a distraction, glare, or flash blind hazard.

Each of the housing parts 10, 20 contain an eyepiece 16, 17 and an objective 18, 19. The eyepiece 16, 17 is disposed closest to the user's eye, while the objective lens 18, 19 collects light and brings it into focus for the user. Objective lens 18,19 may be specially coated to reduce received laser energy that may have been reflected from the target. As the embodiment of FIG. 1 is intended to be simple and low-cost, no mirror or inversion system is used, and no mechanism of focusing the image is provided.

The primary component of a low power laser is a laser diode 45. Such a laser diode can have, for example, a maximum power output of 2.5 mW, a wavelength of 670 nm (nanometers), which would make it a red laser, and be adapted to operate on application of approximately 3V. Diodes with such specifications are readily available; in addition, lasers with similar specifications can be readily substituted. To aid in quickly and easily finding the target, the laser spot size may be expanded from the standard pencil dot size to a larger diameter of about 4 inches. The laser spot size may be controlled to be directly proportional or inversely proportional to the distance to the target. In an embodiment where the laser spot size is inversely proportional to the distance to the target, say the spot size at 10 yards to the target equals 4 inches in diameter, while at 20 yards to the target the spot size equals 3 inches, and at 30 yards to the target the spot size equals 2 inches. On the other hand, in an embodiment where the laser spot size is directly proportional to the distance to the target, say the spot size at 10 yards to the target equals 2 inches in diameter, while at 20 yards to the target the spot size equals 3 inches and at 30 yards to the target the spot size equals 4 inches. The laser at the target may also be rectangular, oval or any other shape that ensures coverage on a face size target, or other predetermined target groups. Other support circuitry is required as well, such as, for example, one or more batteries, a voltage regulator, a capacitor to handle current surges, and a current limiting resistor can all be used. However, other circuit configurations can be used to equal effect.

In addition, the dazzling laser 40 includes a trigger. The trigger can be, for example, a simple pushbutton switch disposed in a position accessible to the user. Generally, on activating switch, the laser diode 45 is coupled to the power source (not shown) and laser light is generated and directed down the center axis 50 of the bridge 30. For example, the trigger can be disposed on top of the bridge 30 so that it is easily accessible to a user's fingers when naturally gripping the dazzling device 1.

The embodiment of FIG. 1 is intended as a simple-to-use, low cost non-lethal dazzling device 1. A user simply picks up the dazzling device 1, aims it at a hostile target's face by looking down the ocular housings 10, 20 through the eyepieces 16, 17 and activates the dazzling laser 40, resulting in the hostile actor being stunned and temporarily neutralized.

Figure 2:
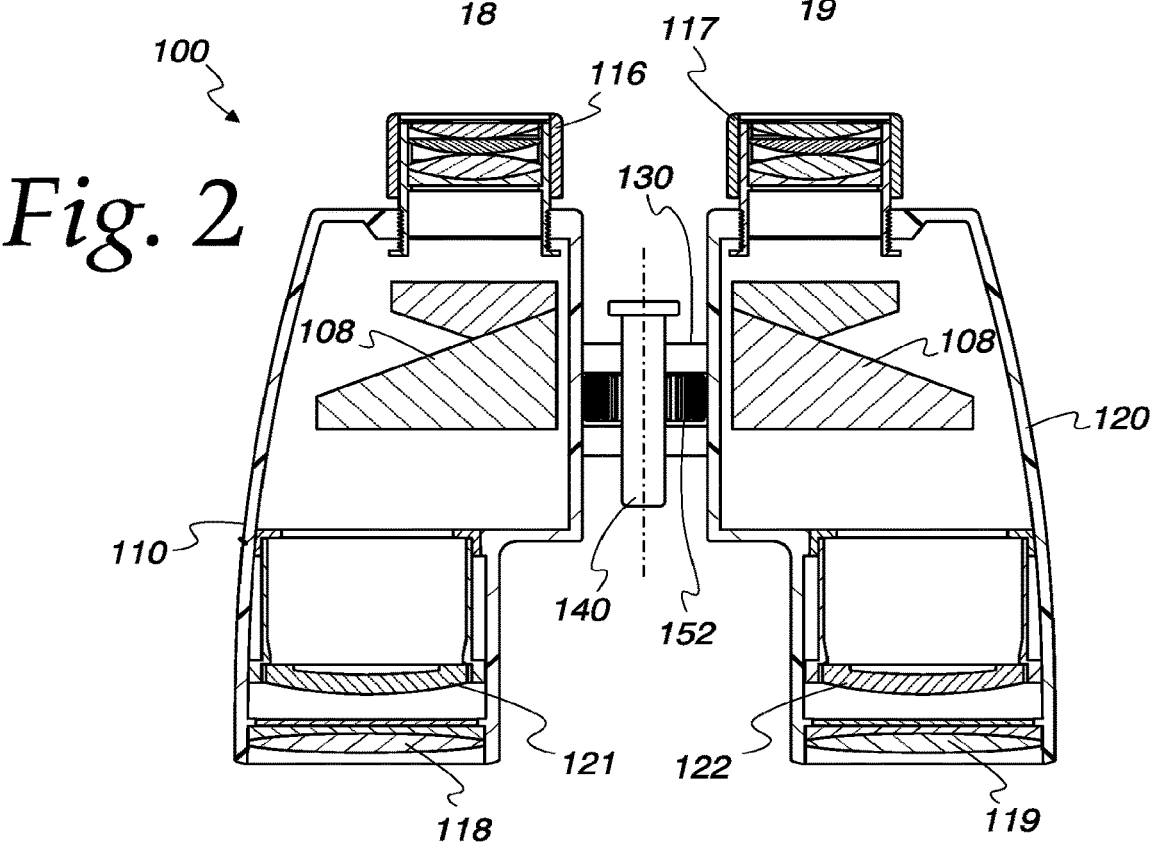
FIG. 2 is a sectional view of the underside of an alternative non-lethal dazzling device constructed in accordance with this disclosure.

Turning to FIG. 2, a more complicated embodiment of the disclosed non-lethal dazzling device is disclosed. In particular, the embodiment of FIG. 2 allows for the user to focus on the hostile target's face while simultaneously adjusting the power of the laser.

FIG. 2 depicts a sectional illustration of the underside of a non-lethal dazzling device 100. A first housing 110 is coupled to a second housing 120 by a bridge 130. Bridge 130 may be jointed, fixed or releasably raised above, inline or below the optics. Each of the housing elements 110, 120 includes an eyepiece 116, 117, an objective 118, 119, and an axially displaceable focusing element 121, 122. In addition, both housings 110, 120 may include identical prism systems 108 for image inversion. Prism systems 108 may be specially coated to reduce received laser energy that may have reflected from the target.

The segment 130 includes a dazzling laser 140. The dazzling laser can optionally be a low-power laser, such as a Class 3R laser diode with a power output of 1.00 mW, a wavelength of 650 nm (making it a red laser) and adapted to operate off of approximately 5V. Such a laser diode is readily available and provides the advantage of providing sufficient power for a reasonable range of 25 yards, while not providing sufficient power to cause irreversible retinal disorder to a hostile target's eyes at distances greater than 11 yards. However, given that the output power is adjustable, a higher power output laser can be safely used as long as care is taken to ensure that only a safe power level for a particular range is used. For example, a 250 mW laser having a wavelength of 532 nm (making it a green laser) and adapted to operate off of 5V. Such laser diodes are readily available and provide the advantage of a far greater range exceeding 500 yards. However, an adjustment mechanism must be used ensure that the power level that is directed at a hostile target's eyes is low enough to not cause irreversible retinal disorder.

In this case, a knob 152 is coupled to the focal components of the optical housing housings 110, 120; i.e., the prism systems 108 and the focus elements 121, 122 using any of the methods known in the prior art, such as transmission rods, etc. In addition, the knob 152 is also coupled to a power adjustment for the laser 140. The power adjustment can be, for example, as simple as a potentiometer, a voltage input to a microcontroller, etc. The power adjustment of the laser is calibrated so that at all distances, when an image is in focus, the power of the laser 140 operable on the hostile target is insufficient to cause irreversible retinal disorder to the target's eyes.

Other components are required for the laser 140 to operate properly. In particular, a power source, such as batteries, and support circuitry, including voltage regulators, current sources, transistors, capacitors, and resistors can be required as well. As with the embodiment of FIG. 1, a push-button switch can be used to activate the laser, and the switch can be mounted on top of the jointed segment 130.

The embodiment of FIG. 2 is intended to provide a longer range non-lethal dazzling device 100. In particular, the dazzling device 100 of FIG. 2 can be operated by a user that must aim the device at a hostile target's face and bringing the same into focus, and activating the dazzling laser 140, resulting in the hostile actor being stunned and temporarily neutralized. To aid in the clear identification of the device to friendly team members, housing 110 and 120 may be painted, molded or otherwise coated in bright or distinctive colors such as blaze orange. Objectives 118 and 119 may be oversized to obscure the identifying marking or color housing from the hostile actor located in front of the device. Housing 110 and 120 may also be flared, expanded, or otherwise modified near objectives 118 and 119 to further mask the bold housing from front view, while still being identifiable from a side view.

Figure 3:
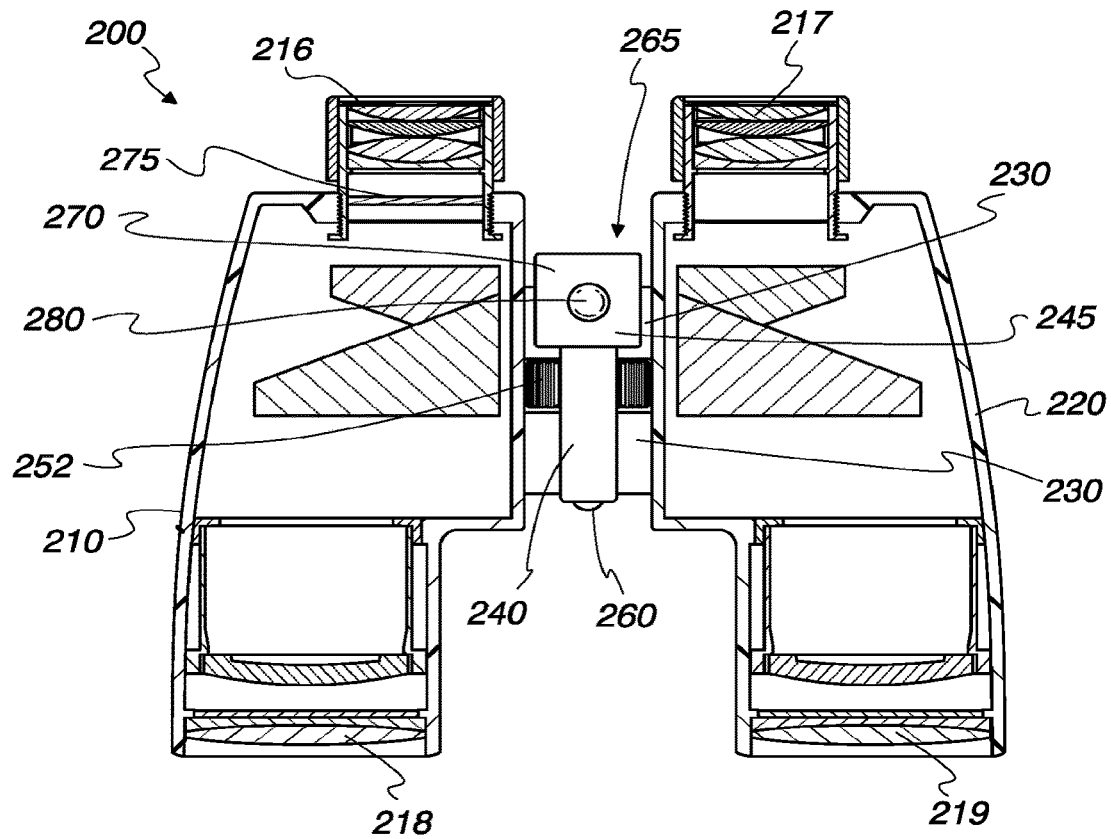
FIG. 3 is a sectional view of one side of an alternative non-lethal dazzling device constructed in accordance with this disclosure.
Figure 3A:
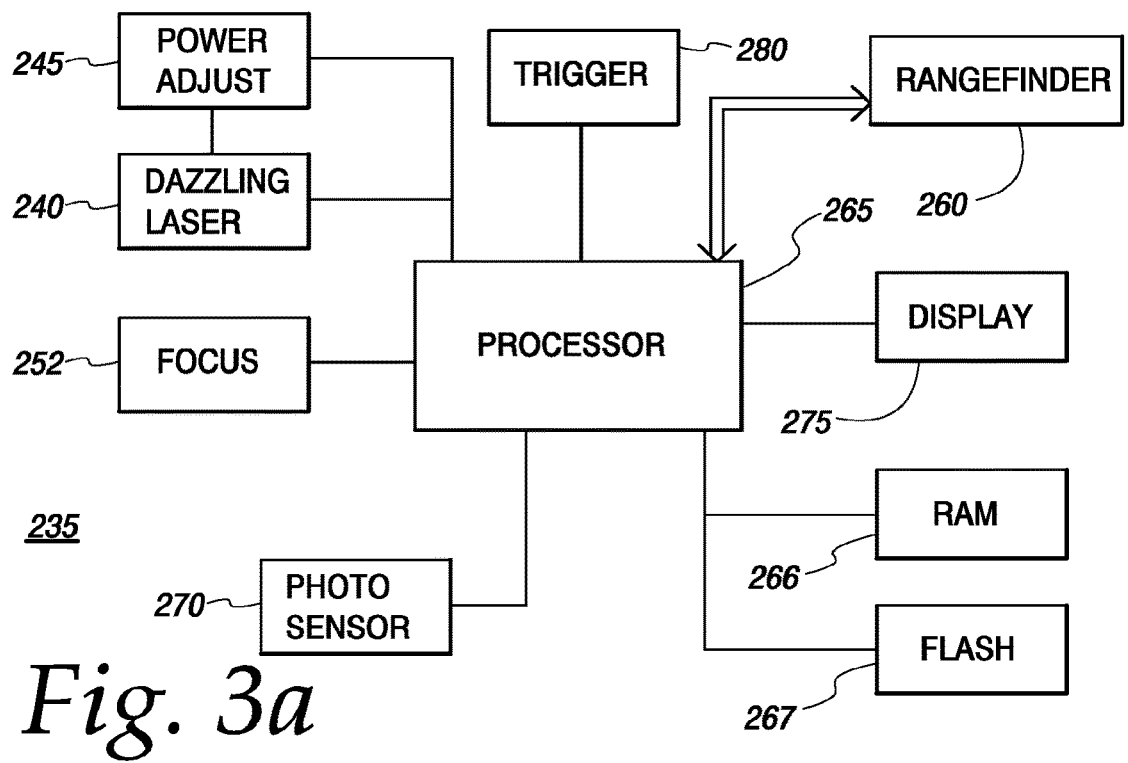
FIG. 3a is a simplified block diagram of some of the components of the non-lethal dazzling device of FIG. 3.
Figure 4:
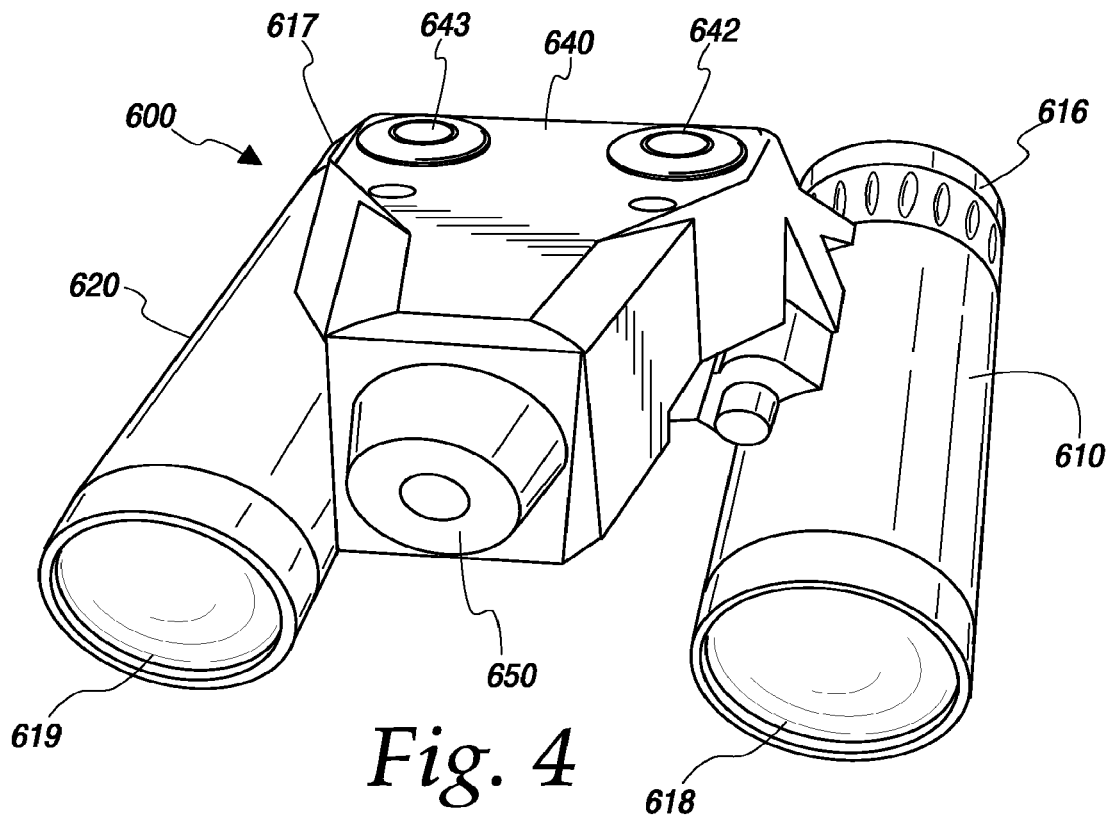
FIG. 4 is a front top perspective view of a non-lethal dazzling device constructed in accordance with this disclosure.
Figure 5:
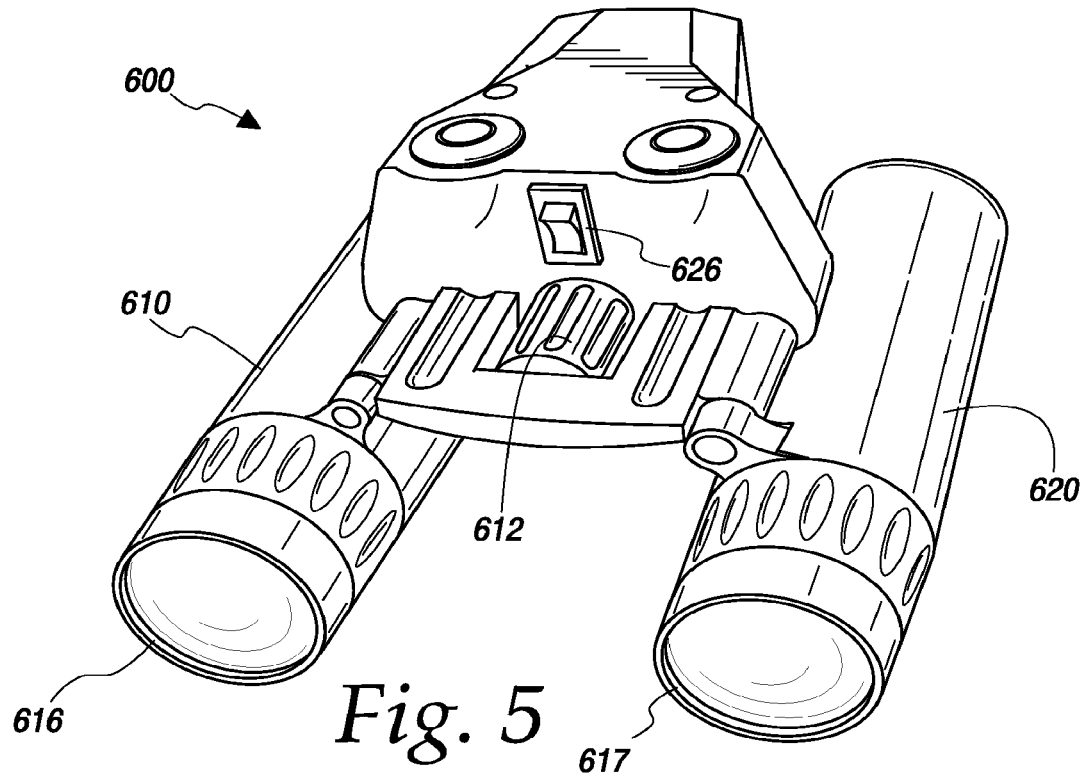
FIG. 5 is a rear top perspective view of a non-lethal dazzling device constructed in accordance with this disclosure.
Figure 6:
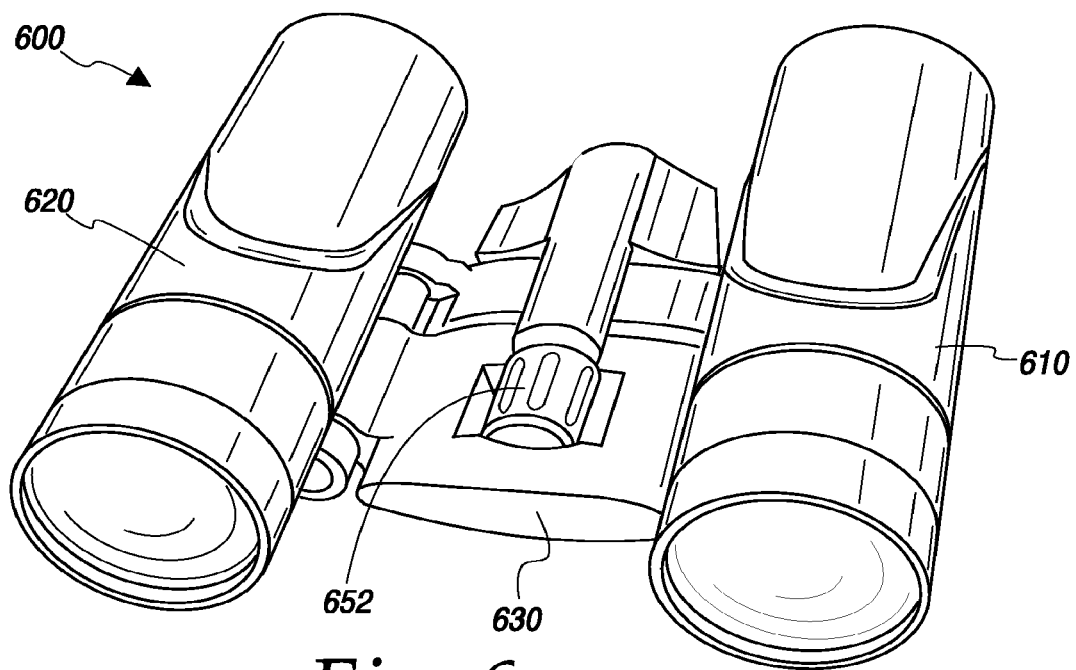
FIG. 6 is a rear bottom perspective view of a non-lethal dazzling device constructed in accordance with this disclosure.

Turning to FIGS. 3 and 3a, a still more complicated embodiment of the disclosed non-lethal dazzling device is disclosed. In particular, the embodiment of FIG. 3 integrates electronic circuitry to perform a number of functions. First, the embodiment of FIG. 3 integrates a range finder. A range finder is a laser-based device that typically operates in a non-visible spectrum, such as infrared. The range finder incorporates a transmitter; i.e., a laser diode, and a receiver, such as a silicon avalanche photodiode, or an InGaAs PIN avalanche photodiode (collectively referred to hereafter as a receiver). The output of the receiver is coupled to a microcontroller or microprocessor (collectively referred to hereafter as "processor"), which then adjusts the power level of a coupled dazzling laser using, for example, a digitally controlled potentiometer, pulse width modulation, delta modulation, the manipulation of aperture size, lens adjustments potentially including beam spreading, polarization plates, an algorithm for rapidly enabling and disabling the laser (other than PWM or DM), bias control and other methods known in the art. In a further electronics-based embodiment, a confirmation can be required prior to activation; i.e., the user would have to go through range finding and activation stages as set forth below to ensure that a hostile target's eyes were not exposed to a power level sufficient to cause irreversible retinal disorder to the target's eyes. In addition, another feature that can be incorporated is the use of a facial recognition functions that can inhibit the dazzle effect unless a person's head or face is recognized. The facial recognition could be enhanced by electronically placing a box or other highlight around the potential target(s) in a display for the user. The facial recognition could be further enhanced or supplemented with independent or co-operating electronic muzzle flash location and highlighting. The functions could also include biometric measurements such as verifying pupil to pupil distance or that the target silhouette size matches within a predetermined tolerance (say 15%) to the distance reported by the range finder. As an alternative embodiment to rangefinder 260, the target silhouette size can be compared electronically to a table of silhouette sizes at known distances to determine the range to the target. In addition, as discussed herein, video recording can also be incorporated and stored on the onboard flash memory 267 or external flash memory (not shown). In addition, the target area size can be appreciably increased and the need for aiming accuracy decreased by incorporating laser scanning methods known in the art. In an embodiment, a refraction element is moved in front of the emitter. In another embodiment, galvanometers or electric motors can move a diffraction grating, lensing or the laser diode with relation to a diffraction grating, mirrors, prisms or other methods known in the art to allow the laser to scan a larger target area. In another embodiment, the need for aiming accuracy can be further reduced by electronically designating a target with a lower power laser or electronic highlight displayed to the user and steering the laser to the optimum target location using the aforementioned beam steering in a "fire and forget" process. In another embodiment, multiple emitters in a grid like pattern are mounted on a substrate that simultaneously or sequentially emit to increase the targeting beam area at the target. An example construction incorporates 10000 laser emitters mounted in a 100×100 pattern that would cover an area of two feet by two feet at 20 yards could have the center lasers mounted at 90 degrees to the substrate and the outmost lasers mounted at 90+1.035 degrees offset to the centerline. Lasers approaching the center would be progressively less offset than 90+1.035 degrees until reaching the centerline of 90 degrees to the substrate. The mounting angle may be mixed or reversed from the above arrangement to allow for a variety of manufacturing techniques. In another embodiment, one or more lasers may be used with a light pipe that diverges into several exit apertures. An example construction incorporates a one or more adjustable power output 532 nm lasers emitting into one or more light pipe(s) with 5000 exit points. The exits would have exit angles formed into a grid like pattern to provide coverage of 2 feet by 2 feet at 20 yards. A photolithographic process may have the devices angled in random locations, while a machined base may have regular angles as determined by standard machining processes. The substrate could also be edge emitting wherein the lasers are mounted on the substrate edge providing the necessary offset. This wide aiming angle would make the device suitable for non-steady platforms such as drones or other vehicles in motion.

The embodiment of FIGS. 3 and 3a is similar to the embodiment of FIG. 2, except that its dazzling and optical functions are now electronically controlled. In particular, FIG. 3 depicts a non-lethal dazzling device 200. A first housing 210 is coupled to a second housing 220 by a bridge 230. Each of the housing elements 210, 220 includes an eyepiece 216, 217 and an objective 218, 219. Other optical elements may be included as described with regards to the embodiment of FIG. 2, or as known in the prior art.

Within the bridge 230, a range finder 260 is disposed. As discussed above, the rangefinder includes a transmitter, which is generally a laser diode that is adapted to produce non-visible light, such as infrared. It is anticipated that other methods known in the art of range finding will be suitable including passive autofocus, phase detection, and contrast detection. In addition, the rangefinder may include a receiver, and other components as is known in the art. In addition, the bridge 230 incorporates a dazzling laser 240. The dazzling laser 240 generally will have a power output of tens or more milliwatts, which would generally make the device banned by treaty. However, as disclosed herein, the power adjustment circuit will ensure that the power level that the target is exposed to is low enough so that no irreversible retinal disorder will be done to the target's eyes. In an embodiment, range finder 260 is mounted to determine range to the target, Range finder 260 may also be oriented toward the target and a second range finder (not shown) may be oriented toward the user to ensure the user is holding the device in the correct orientation with 216 and 217 toward the user and 218 and 219 toward the target. In an embodiment, the forward facing range finder would need to detect a range greater than the longest arm's length of about four feet, and the rear range finder would need to detect a range less than 1 foot to ensure the dazzler is in the correct orientation to prevent self-dazzling of the operator Both the dazzling laser 240 and the rangefinder 260 are coupled to a processor 265. The processor 265 requires certain support circuitry, including RAM 266 and FLASH 267. It should be noted that other types of storage, such as magnetic RAM, may be viable in the future, and the specific type of short-term and long-term memory that is utilized is not intended as a limitation of the disclosure unless it is expressly claimed. The processor 265 is coupled to a power adjustment 245 circuit, which controls the power level of the dazzling laser 260. In addition, the processor 265 is coupled to a photosensor 270, to record video of the image that the user would observe from one of the optical lenses, such as the eyepiece 216 of the left housing 210. The video display may also be used for electronic target designation where a box or other highlight could be placed on electronically recognized targets using image recognition techniques known in the art, such as muzzle flash, firearms, or other suitable targets or conditions. The user may scroll through the highlighted targets by touching trigger 280 for a second predetermined time period or scroll using an additional target selector control similar to 280 such as a joystick, spin-wheel, or the like may be added. It is anticipated that targeting may also be completely under device software or remote-control using wireless communication methods such as 5G or similar protocols known in the art. A similar mechanism would allow a video display 275 from photosensor 270 to be shown to one of the optical lenses, such as the eyepiece 216 of the left housing 210. A focus dial 252 is disposed in the jointed bridge 230 as well; the method of operation of the focus can be similar to that of FIG. 2, or can operate in any other way known in the art, including entirely digitally, thus minimizing potential effects to the operator should reflective surfaces be targeted. Finally, the processor 265 is coupled to a trigger 280, which can be, as previously described, a push button switch disposed on the top of the bridge 230 where a user's fingers would naturally be disposed when handling the device non-lethal dazzling device 200. In addition, a battery 284 provides power to the electronic components.

In operation, a user would pick up the non-lethal dazzling device 200 and aim the device 200 at a hostile target (not shown). Once the hostile target's face was in focus (after electronic focus or using the focus dial 252), the user would press the trigger 280 a first time activating the transmitter (not shown) of the range finder 260. The receiver (not shown) of the rangefinder 260 would report a range to the processor 265. The processor 265 would then update the display 275 so as to notify the user that the dazzling laser is going to be activated. This will allow the user to ensure that the hostile target is still at approximately the same range as when s/he activated the rangefinder, and that no targets are closer than the hostile target, and therefore in danger of suffering irreversible retinal disorder. If the user presses the trigger 280 a second time within some predetermined amount of time, such as 5.0 seconds, the processor activates the dazzling laser 240 after programming the power adjustment circuit 245 so as to ensure that the equivalent power disposed on the hostile target's eyes is at a level that will dazzle the hostile target without causing irreversible retinal disorder to the hostile target's eyes. The above process may also be software controlled whereby the processor inhibits the dazzling laser until range is confirmed by the processor and the laser is turned on at eye safe power levels as soon as the processer confirms distance at the first button press. Additional embodiments may inhibit the laser until a beam steering mechanism can be electronically confirmed to be optimally on target to say 0.1 inches at 100 yards. Other embodiments include multiple single button presses or the pressing of a number of buttons, say 5, in a predetermined sequence.

The potentially high-power output of the dazzling laser 240 allows the device 200 to be used at long ranges, such as more than 100 yards. In addition, the high-power output of the dazzling laser 240 can also be useful if countermeasures, such as special glasses, are used, or if the environment contains smoke or dust that would affect the received power level. In such a case, a high-power override can be incorporated, allowing the user to manually to set the power level by, for example, holding the trigger 280 while adjusting the focus dial 252. In an additional embodiment, the built-in optics, electronics, and/or video processing may autodetect faces, muzzle flashes, weapons or the like and provide the user with electronic highlighting around the target using a display. The electronics may also detect the presence of countermeasures or airborne contaminants and automatically adjust the power, frequency, frequency hopping, beam steering, or other beam properties to a predetermined different, but still eye safe, profile for the current environment or countermeasures.

Figure 7:
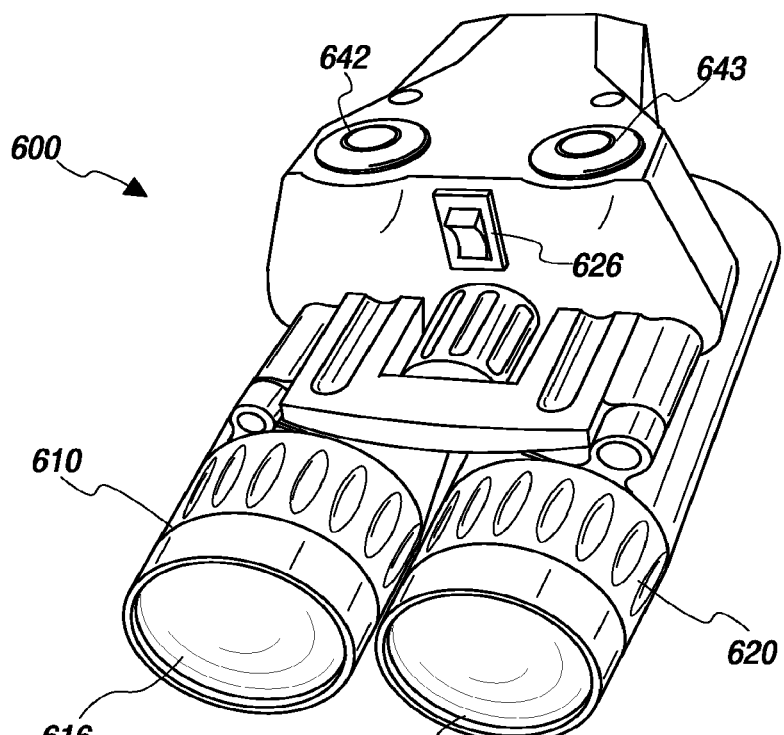
FIG. 7 is a rear perspective view of a non-lethal dazzling device in a compressed form.

Turning to FIGS. 4-7, the underside of an additional non-lethal dazzling device 600 constructed in accordance with this disclosure is depicted. A first housing 610 is joined to a second housing 620 by a bridge 630. The bridge 630 incorporates a focal mechanism that can be constructed similar to those that were disclosed with previous embodiments, and which can be controlled by knob 652. As depicted, bridge 630 is jointed, so that the first housing 610 and second housing 620 can be collapsed into a smaller space as depicted in FIG. 7. Both housing elements 610 and 620 include elements similar to those shown in the embodiment of FIG. 2, including an eyepiece 616, 617, an objective 618,619, focal elements (not shown), and prism systems (also now shown) if image inversion is required.

Mounted on top of the bridge 630 is a dazzling module 640. The dazzling module 640 includes a power switch 626, a first button 642, and a second button 643. The power switch 626 turns the dazzling module 640 "on" or "off." As explained below, the first button 642 activates the dazzling module 640 in low power mode, while the second button 643 activates the dazzling module 640 in high power mode. The dazzling module further includes a dazzling laser 650. This particular embodiment could employ a wavelength of 532 nm, making it a green laser, with a power output of 4.9 mW. The drive circuit of the laser is adapted to limit the actual power output of the laser so that the effective safe dazzling range of the laser would be limited to 50 yards when activated in low power mode (the first button 642), and more than 150 yards when activated in high power mode (the second button 643).

Typically, the way that a user would utilize the non-lethal dazzling device 600 disclosed in FIGS. 4-7 would be to point the non-lethal dazzling device 600 at the hostile actor and use the focal knob 652 to acquire the hostile actor's face. Once the hostile actor's face is in focus, the user would then press either the first button 642, if the user is less than 50 yards away, or the second button 643 if the user is more than 200 yards away. The distances and power levels are example distances, and it is anticipated that dazzlers would be made with ranges for typical structures such as churches or shopping malls.

Figure 8:
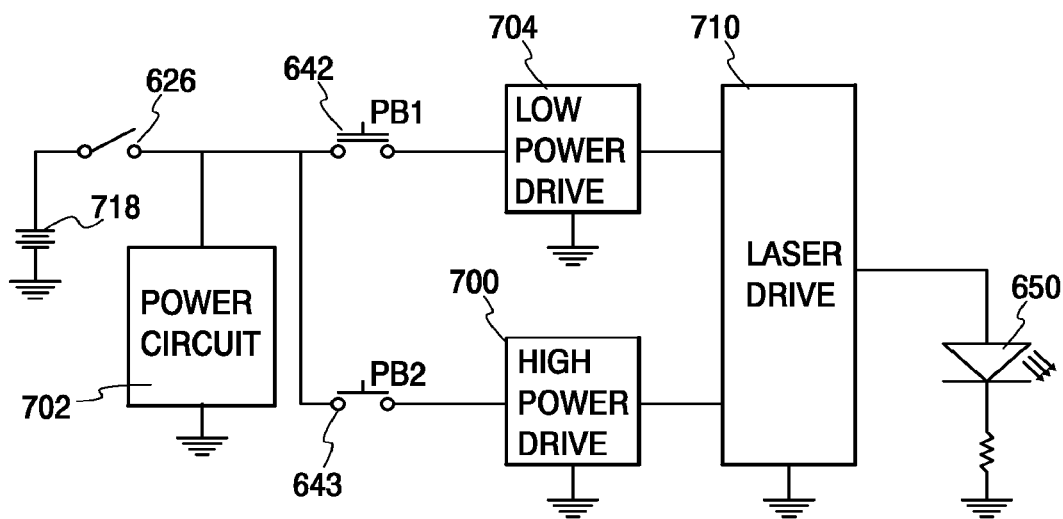
FIG. 8 is an exemplary simplified schematic circuit diagram of a dazzling circuit for use with a non-lethal dazzling device constructed in accordance with this disclosure.

Turning to FIG. 8, a simplified schematic block diagram for the embodiment of dazzling module 640 disclosed in FIGS. 4-7 is illustrated. A switch 626 couples a battery 718 to a power circuit 702, which provides power to the remaining components of the dazzling module. The power circuit 702 can be implemented in a variety of means known in the art, such as a switching power supply, or a simple linear supply circuit. A first pushbutton switch 642 serves to couple a low power drive circuit 704 to Laser Drive 710, while a second pushbutton switch 643 couples a high-power drive circuit 706 to the Laser Drive 710.

The low power drive circuit 704 programs the Laser Drive 710 to limit the power to the laser 650, while the high-power drive circuit 706 allows the Laser Drive 710 to provide the maximum permissible power to the laser 650. The low power drive circuit 704 and high-power drive circuit 706 may provide analog inputs or digital inputs to the Laser Drive 710, whose operation is similarly bound only by the prior art. Finally, the Laser Drive 710 powers the Laser 650, which will produce an appropriate intensity beam.

Figure 9:
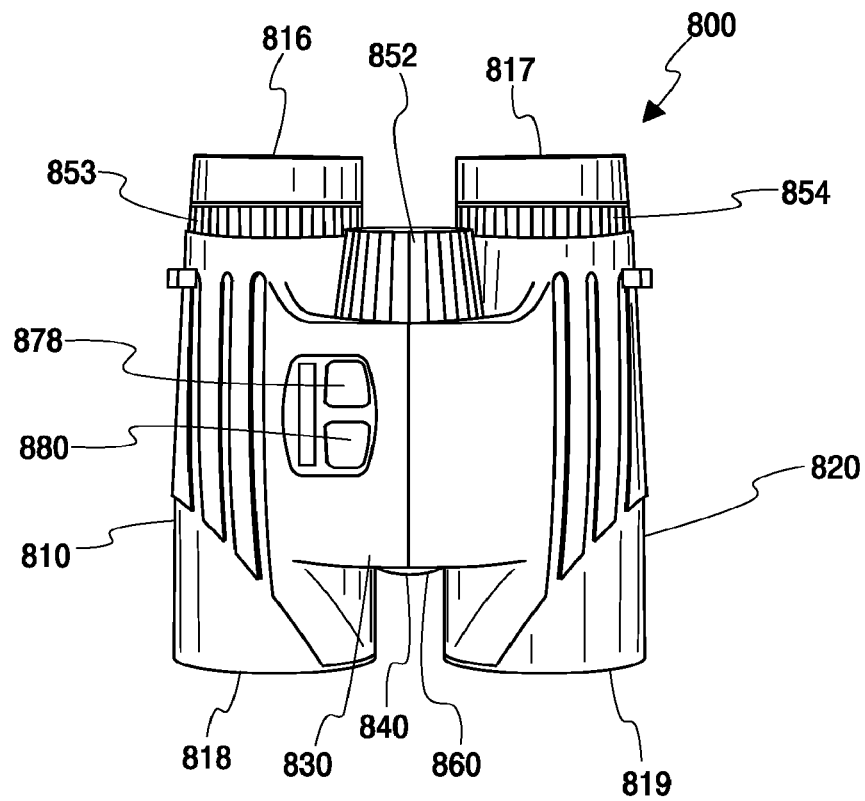
FIG. 9 is a top perspective view of a non-lethal dazzling device constructed in accordance with this disclosure.
Figure 10:
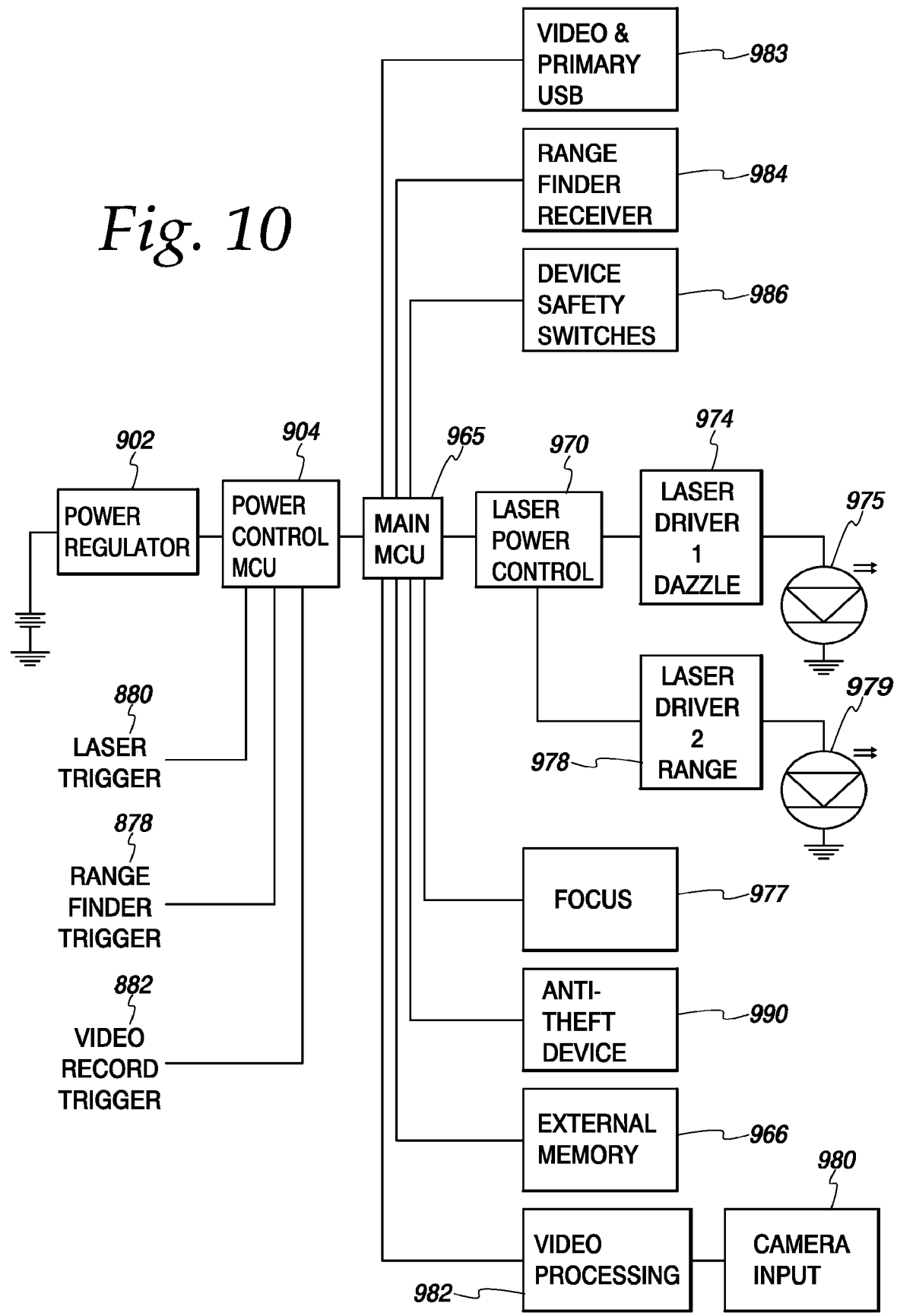
FIG. 10 is an exemplary simplified schematic circuit diagram of a dazzling circuit for use with a non-lethal dazzling device constructed in accordance with this disclosure.

FIGS. 9 and 10 discuss an embodiment that is similar to that disclosed in FIGS. 3 and 3a. In particular, FIG. 9 depicts a non-lethal dazzling device 800 that includes a first housing element 810 and a second housing element 820. The first housing element 810 is coupled to the second housing element 820 by a bridge 830. As depicted, the bridge 830 is jointed and incorporates an articulating hinge, which allows the non-lethal dazzling device 800 to be compressed into a smaller form factor for storage. The first housing element 810 includes an eyepiece 816 and an objective 818. The second housing element 820 includes an eyepiece 817 and objective 819. The first housing element 810 also includes a diopter focus 853, and the second housing element 820 includes a diopter focus 854. Other optical elements can be included as described with regards to the other embodiments disclosed herein, or as known in the prior art.

The bridge 830 includes a range finder 860. The rangefinder 860 can be similar to that disclosed with regards to the embodiment of FIGS. 3 and 3a. Rangefinder 860 may also use alternative methods of range finding, as an example serving as a video camera and combining the dazzler height (h), the angle subtended between a target and the horizon (b) to determine the distance (d), using the formula d=tan(b)×h. Similar mathematical calculations may be used to estimate the target distance using the video image. The bridge 830 also includes a dazzling laser 840. The laser 840 can have, for example, a power output of 4.9 mW with a wavelength of 532 nm making it a green laser. It is anticipated to minimize the profile of the complete device that Laser 840, rangefinder 860, photosensor 270 and all other associated components could be contained inside of the first housing element 810 or the second housing element 820 with the corresponding image displayed to the user on video display 275.

Turning to FIG. 10, a simplified schematic diagram of a circuit for use with the non-lethal dazzling device 800 disclosed in FIG. 9 is illustrated. A battery 918 provides power to a power regulator 902, which provides power to power saving processor 904 which keeps the dazzler in very low power mode until activated, say five microwatts, yielding a typical lithium battery cell standby life of more than five years. Lower standby power modes can be achieved through the use of isolating electronics, mechanical switching or the use of relays or other similar mechanisms. The power processor 904 accepts inputs from a laser trigger 880, a range finder trigger 878, and a video recorder trigger 882. The power processor 904 is coupled to the main processor 965. The main processor 965 can incorporate its own storage, including random access memory for computations and short-term storage, and FLASH memory for long term storage. The main processor 965 can also incorporate its own support circuitry. However, given the ability to record video, at least some external memory 966 will be required. The external memory 966 can include FLASH memory, magnetic RAM, or other types of storage.

The main processor 965 further controls a laser power control circuit 970. The laser power control circuit 970 can be programmed via analog inputs generated by the main processor 965, or via digital commands. The laser power control circuit 970 controls a number of laser drive circuits (there are two illustrated). In the illustrated embodiment, the laser power control circuit 970 controls two laser drive circuits; a first laser drive circuit 974 which drives a first laser 975 and a second laser drive circuit 978 which drives a second laser 979. For example, the first laser drive circuit 974 and first laser 975 may be adapted for close range dazzling, while the second laser drive circuit 978 and second laser 979 may be adapted for longer range dazzling. Alternately, second laser 979 may be adapted for transmission and range finding the target in conjunction with range finding receiver 984. Alternately, second laser 979 may be adapted to supplement first laser 975 by being offset by a typical interpupil distance, or may provide a more divergent or less divergent beam then first laser 975. The main processor 965 is also connected to a range finder receiver 984 which functions as discussed previously with other embodiments.

The main processor 965 can automatically program the laser drive circuit based on input from the focus 977, the rangefinder 984, or a combination thereof. As discussed above, the rangefinder receiver 984 could report a range of an object, and the main processor 965 could set the power via the laser power control 970 appropriately. Alternatively, the main processor 965 could monitor the setting of the focus 977 and use that as the primary means to program the laser power control 970. In such a case, the video processing circuitry 982 could implement a Gaussian Filter, or other mechanism known in the art to insure that the object being aimed at is actually in focus—this would prevent accidental or intentional irreversible retinal disorder.

The main processor 965 also controls a video recording circuit, which can comprise a camera 980 as well as video processing circuitry 982. Camera 980 and video processing circuitry 982 may also be used to detect rapid movement of the dazzling device using well known video processing techniques. The video processing circuitry 982 and main processor 965 would reduce or turn off laser driver 974 until the dazzler stabilized and range finder 984 could report stable distance to processor 965. It should be noted that digital cameras and image processing are well known in the art at this point, and any suitable prior art mechanism can be used. The video processing circuitry 982 can also be used to detect when the non-lethal dazzling device 800 is quickly moved; for example, a user may have focused on a hostile actor 200 yards away, and then suddenly turned to her left to focus on a potential hostile actor 10 yards away—if the laser is maintained at the same intensity, it could damage the potential hostile actor's eyes, so the video processing circuitry 982 could act to disable the laser until a proper range is calculated using the mechanisms discussed herein. Additionally, any suitable inertial sensor such as an electronic compass, accelerometer, electronic gyroscope or the like could be used and incorporated into device safety switches 986, thus preventing the operation of the dazzling laser unless the rangefinder and power level was at a correct level.

The main processor also couples to input/output port 983, which can be used to access recorded video or to program the non-lethal dazzling device 800 with software updates, settings, etc. The port may operate in a wired fashion say USB, JTAG, RS488 or wirelessly, say Wi-Fi, 5G, Bluetooth or inductive coupling. Similarly, the main processor 965 monitors an anti-theft device 990, which, when active, will cause the processor 965 to prevent any functioning of the non-lethal dazzling device 800. Anti-theft device 990 may use any of the anti-theft features known in the art. For example, anti-theft device 990 may allow a remote device, such as a smartphone or a server, to send a signal to the anti-theft device 990 over a wireless network that would disable the non-lethal dazzling device 800. Alternatively, anti-theft device 990 may only operate if it detects a signal or response from a second device, such as a base station or an RFID device. Alternatively, anti-theft device 990 may utilize geo-fencing; i.e., it will only operate if it is placed in a particular bounded area or areas. Anti-theft device 990 can make use of various biometric authentication mechanisms, such as a finger print reader, voice recognition, face recognition, etc. It should be noted that various other means known in the art can also be used by the anti-theft device 990. In addition, the main processor 965 monitors one or more device safety switches 986 such as housing interlocks used to turn off the laser and associated circuitry if any user service covers are opened.

In practice, a user would pick up the non-lethal dazzling device 800 and aim the device 800 at a hostile target (not shown). The user would then use the center focus dial 852 or the diopter focus dials 853, 854 to bring the hostile target's face into focus. The user then presses the range finder trigger 878 activating the transmitter of the ranger finder 979. The ranger finder receiver 984 would then report a range to the main processor 965. The main processor 965 may notify the user that the dazzling laser is going to be activated by, for example, flashing an LED, or activating an audible chip using a speaker (not shown). This will allow the user to ensure that the hostile target is still at approximately the same range as when s/he activated the rangefinder, and that no targets are closer than the hostile target, and therefore in danger of suffering irreversible retinal disorder. The user would then press the laser trigger 880 to activate the non-lethal dazzling device 800. The main processor 965 then programs the laser power control 970 and activates the appropriate laser drive circuit and the appropriate laser. In one embodiment, the main processor 965 selects the laser drive circuit and laser based on the range information received by the range finder receiver 984. In another embodiment, focusing operations are fully automatic using well known automatic focus techniques.

The potentially high-power output of the non-lethal dazzling device 800 allows the device 800 to be used at long ranges, such as more than 100 yards. In addition, the high-power output of the non-lethal dazzling device 800 can also be useful if countermeasures, such as dark sunglasses, are used, or if the environment contains smoke or dust that would affect the received power level.

The previously disclosed non-lethal dazzling device embodiments are targeted to military and law-enforcement personnel, as well as other trained users. In particular, the previously disclosed embodiments are designed to be used at range by trained users that are able to target a hostile actor's face. However, the principles of a non-lethal dazzling device can also be applied to a device intended for use by the general populace. The advantage of such a device are readily apparent. In particular, a general-purpose device could be used by a person in a typical self-defense situation, i.e., when unexpectedly confronted by a hostile actor.

Figure 11:
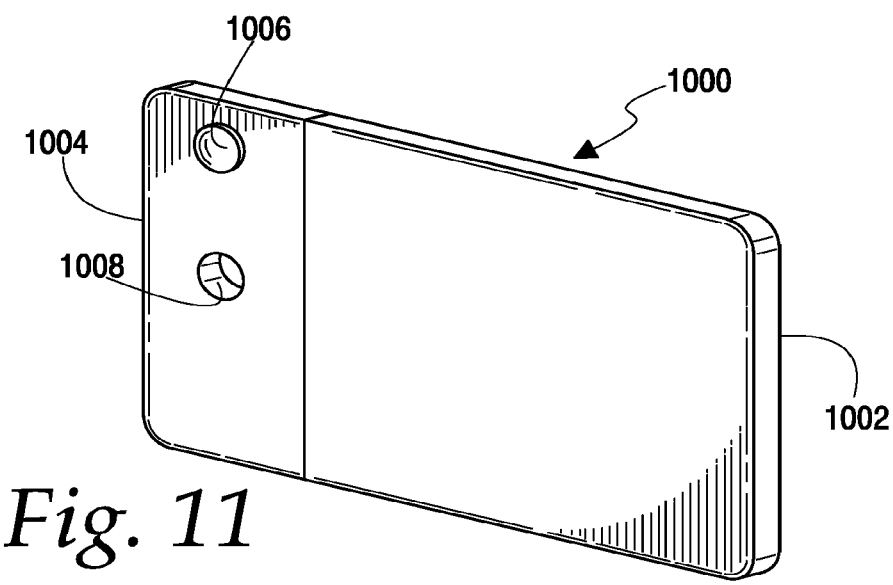
FIG. 11 is a front perspective view of a personal non-lethal dazzling device constructed in accordance with this disclosure.
Figure 11A:
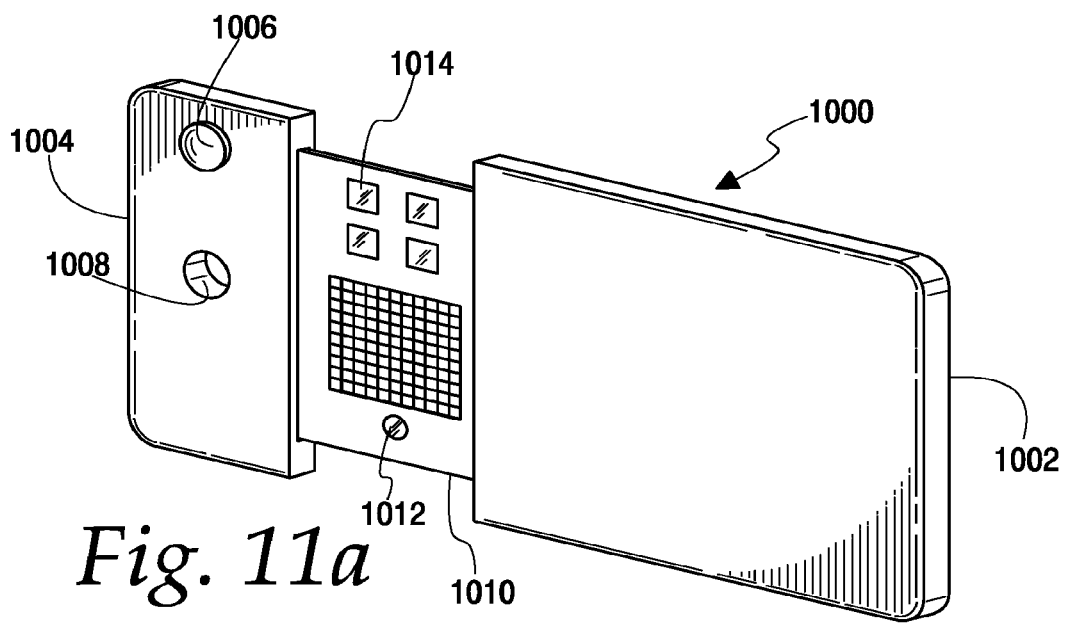
FIG. 11a is a second front perspective view of a personal non-lethal dazzling device constructed in accordance with this disclosure.

The non-lethal dazzling device disclosed in FIG. 11 is one potential embodiment of a personal non-lethal dazzling device 1000. In particular, the personal non-lethal dazzling device 1000 incorporates a back housing 1002 and a front housing 1004. The front housing 1004 is slideably coupled to the back housing 1004, so that the front housing 1004 can slide away from the back housing as depicted in FIG. 11*a*. When the front housing 1004 is slid away from the back housing 1002 an internal panel 1010 is exposed. When the personal non-lethal dazzling device 1000 is in its most compact form, it could be sized to be the same size as a credit card when laid flat, and of the same thickness as 2-4 typical credit cards laid on top of one another. This will allow the personal non-lethal dazzling device 1000 to be stored in a pocket, common wallet or money clip, so that the personal non-lethal dazzling device 1000 can be concealed from view until needed.

The front panel 1004 includes a trigger 1006, which in this case is a simple button. The front panel also includes a lanyard hole 1008. Turning to the user panel 1010, the user panel includes an aiming aid 1014, which is disposed above a laser array 1016. In an embodiment, aiming aid 1014 is a simple cutout window. In other embodiments, aiming aid may be a lens, electronic viewfinder, camera, or other targeting aids known to the arts. The laser array 1016 could comprise an array of a number, such as forty-nine, separate lasers, although a different number of lasers could also be used. In such a case, each of the lasers could be, for example, a class 1 laser, or a class IIa laser operating at 532 nm with a total power output of less than 1 milliwatt each. Alternatively, a single higher power laser along with a lensing system, such as a beam-spreader, light pipes or other beam expanding techniques discussed herein, could be used as the laser array 1016. In such a case, a 532 nm laser with a power output of 4.9 milliwatts or greater could be used, along with a suitable beam-spreader technique.

The user panel 1010 also includes a proximity sensor 1012. The proximity sensor 1012 can be, for example, an infrared or ultrasonic proximity sensor. The proximity sensor 1012 is primarily intended to prevent operation of the personal non-lethal dazzling device 1000 when a person is within close proximity to the device. For example, the proximity sensor 1012 may inhibit operation when any object is detected within 0.5 meters of the proximity sensor. Proximity sensor 1012 may also be duplicated on the back side and operate in conjunction with front side proximity sensor to prevent operator self-dazzling. These minimum distances front to the target and rear to the user of say a minimum of four feet to the front and a maximum of one foot to the rear can help prevent a user from dazzling him or herself with the personal non-lethal dazzling device 1000 or from operating the personal non-lethal dazzling device 1000 in circumstances where it could cause irreversible retinal disorder.

Figure 12:
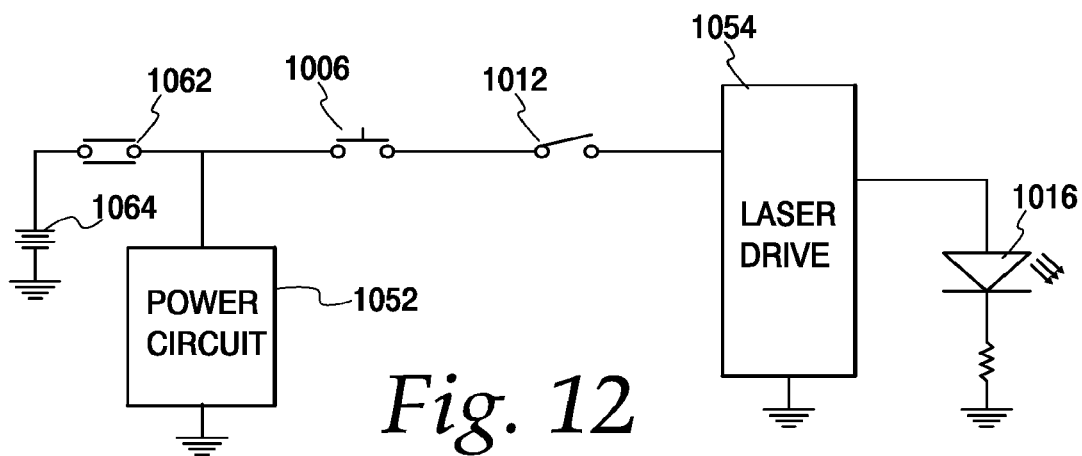
FIG. 12 is an exemplary simplified schematic circuit diagram of a dazzling circuit for use with a personal non-lethal dazzling device constructed in accordance with this disclosure.

Turning to FIG. 12, an exemplary simplified circuit diagram that implements the personal non-lethal dazzling device 1000 is depicted. In particular, the circuit includes a battery 1064. The battery 1064 is sized to allow for a reasonable number of uses, such as, for example, 500 uses, and will have suitable durability, such as a ten-year life. The battery 1064 could be replaceable or permanent. A slider switch 1062 is coupled between the battery 1064 and a power circuit 1052. The power circuit 1052 is adapted to provide conditioned power to the remaining components of the circuit, and can operate using any of the ways known in the art, such as via a linear regulator or a switching power supply.

A pushbutton 1006 operates to activate the personal non-lethal dazzling device 1000. The proximity sensor 1012 acts as a switch, disabling the device when an object is detected in close proximity. Finally, a laser drive 1054 powers a laser array 1016. The laser drive 1054 can operate as previously disclosed herein. In an alternative embodiment, proximity sensor 1012 may be a range finder as previously disclosed herein and provide ranging information to adjust the output of dazzling laser as previously disclosed herein.

In operation, a user will take the personal non-lethal dazzling device 1000 out of storage; i.e., out of the user's purse, wallet, money clip, pocket, etc., and slide the front housing 1004 away from the back housing 1002. The user will then use the aiming aid 1014 to target the hostile actor. The proximity detector 1012 will allow operation of the personal non-lethal dazzling device 1000 as long as no object is within 0.5 meters of the proximity detector 1012 in the direction the proximity detector 1012 is facing. Once the hostile actor's face is targeted, the user will use the trigger 1006 to activate the laser array 1016, which will either dazzle or at least warn the hostile actor, depending on the range from the hostile actor to the activated device.

Dazzler-Camera System

Figure 13:
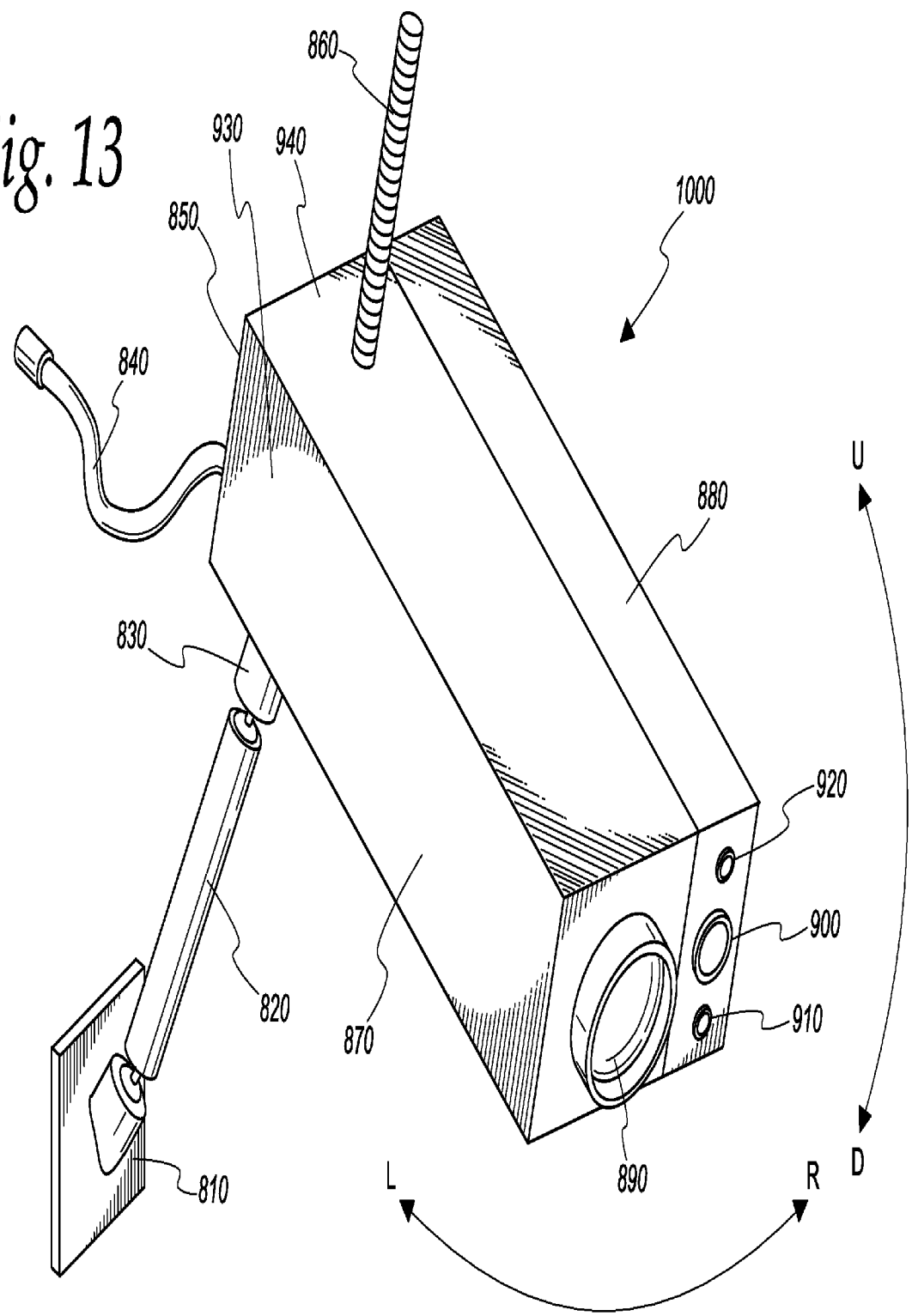
FIG. 13 is a perspective side-view of a non-lethal camera mounted dazzling device constructed in accordance with this disclosure.

Returning to the Figures and to FIG. 13 in particular, the side of a non-lethal dazzling assembly 1000 constructed in accordance with this disclosure is depicted. A first wall mount 810 is joined to a mounting post 820 to articulating mount 830 which is then mounted to camera 870 with camera lens assembly 890. The embodiment of FIG. 13 mounts to camera 870 from the bottom but may be mounted from the camera top 940, back 850, side 930 or other direction well known to the security camera arts as needed for a particular installation. Wireless antenna 860 and or cable 840 may or may not be present to transfer video images and motion commands to the camera articulator and dazzler final position articulator if used. Mounted adjacent to camera 870 is dazzler assembly 880. In the front of dazzler assembly 880 emitting parallel to the optical axis of camera 880 is dazzler emitter 900, dazzler camera 910 and optical range finder 920. The embodiment of FIG. 1 shows dazzler 880 as a separate attachment, but other embodiments may have the component parts of dazzler 880 integrated into camera body 870 or may be housed independently from camera body 870. For example, the dazzling laser 900 can be a Class 3R laser with a power output of, for example, 2.5 milliwatts (mW). A Class 3R laser will generally not cause permanent harm to a person's eyes during a momentary exposure of less than 0.25 seconds, which is within the aversion response; i.e., where a person turns away or blinks to avoid bright light. While a Class 3R laser will not cause permanent harm, it generally can serve as a distraction, glare, or flash blind hazard.

The primary component of a low power laser is a laser assembly 900. Such a laser assembly can have, for example, a maximum power output of 2.5 mW, a wavelength of 670 nm (nanometers), which would make it a red laser, and be adapted to operate on application of approximately 3V. Diodes with such specifications are readily available; in addition, lasers with similar specifications can be readily substituted. In particular, lasers with maximum power outputs of 5.0 mW and above are classified as Class 3B, which is capable of causing permanent damage to a person's eye even with a momentary exposure unless the output power is limited by support circuitry. Other support circuitry, such as, for example, one or more batteries, a voltage regulator, a microprocessor, a capacitor to handle current surges, and current regulating circuitry can all be used. However, other circuit configurations can be used to equal effect.

In addition, the dazzling laser 900 is coupled via electronic circuitry to range finder 910 which help determines the distance to the target within an accuracy of say plus or minus one centimeter. Similarly, electronically coupled to dazzling laser 900 is video camera 920. Camera 920 can be used for alignment purposes to dazzler 900, to assist range finder 910, and/or to serve as image gathering for the targeting process with or without associated Artificial Intelligence aid to the targeting process. When dazzler 1000 is triggered range finder 910, optionally camera 920 and the associated circuitry work cooperatively to dazzle a target without harm with laser light generated and directed down the center axis of dazzler 880 as mutually directed by camera 870.

The embodiment of FIG. 13 is intended as a simple-to-use, low cost non-lethal security dazzler. A remote user simply remotely commands camera 870 via articulating mount 830 to point at the offender and triggers dazzler assembly 880. Dazzler assembly 880 activates dazzling laser 900, resulting in the hostile actor being stunned and temporarily neutralized.

Alternatively, the embodiment of FIG. 13 may be aimed automatically as an assembly, or just the dazzler may be aimed remotely, manually, or via artificial intelligence as determined from images gathered and processed by camera 890, and or camera 920. The artificial intelligence software or firmware may recognize and categorize a wide range of threats scenarios including, posture, pulse rate, IR emission, shown or hidden weapons, metal detection, identity in a crime database or other factors to make a threat assessment and a dazzler emission from dazzler assembly 880.

Figure 14:
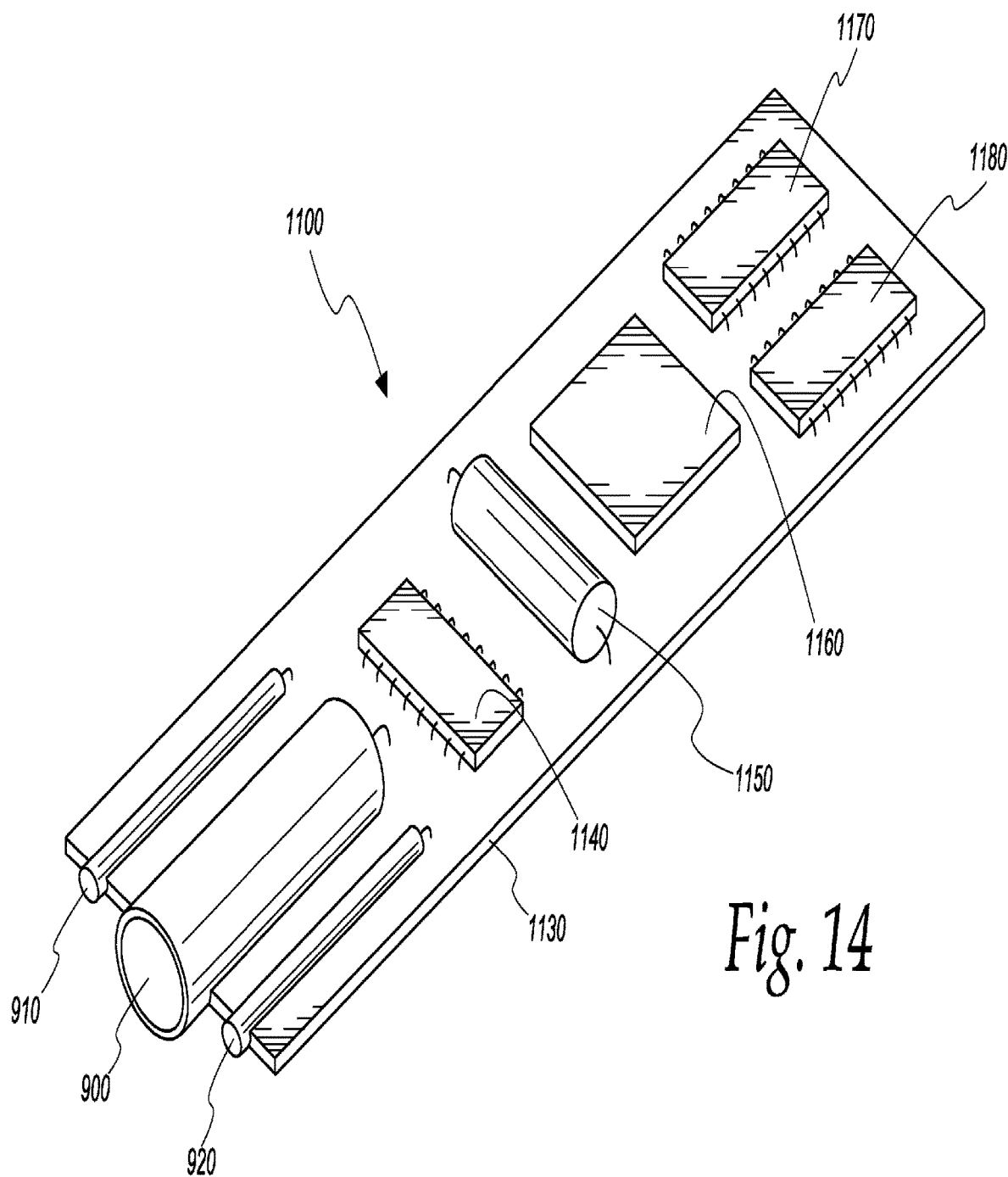
FIG. 14 is a cutaway view of a circuit board for use in the non-lethal camera mounted dazzling device of FIG. 13.

Turning to FIG. 14, a perspective view of the exemplary circuitry 1100 for dazzler 880. In particular, circuit board 1130 hold laser assembly 900, range finder 910 and camera 920. The embodiment of FIG. 14 allows for additional support circuitry such as custom power control circuit 1140, capacitor 1150, processor 1160 and I/O circuitry 1170 and 1180. However, other circuit configurations can be used to equal effect. This example construction is optimized for cameras that have a longer length than width. Circuit board 1130 may be any manufacturable shape or construction that allows for mounting and tracking with a co-operating area of coverage. Similarly, circuit assembly 1100 may be integrated with camera circuitry well known in the arts to form a camera dazzler assembly. This integrated assembly could reduce costs by eliminating duplicate components such as power supplies and processors but may be more difficult to have the camera join existing security camera business ecosystem.

Figure 15:
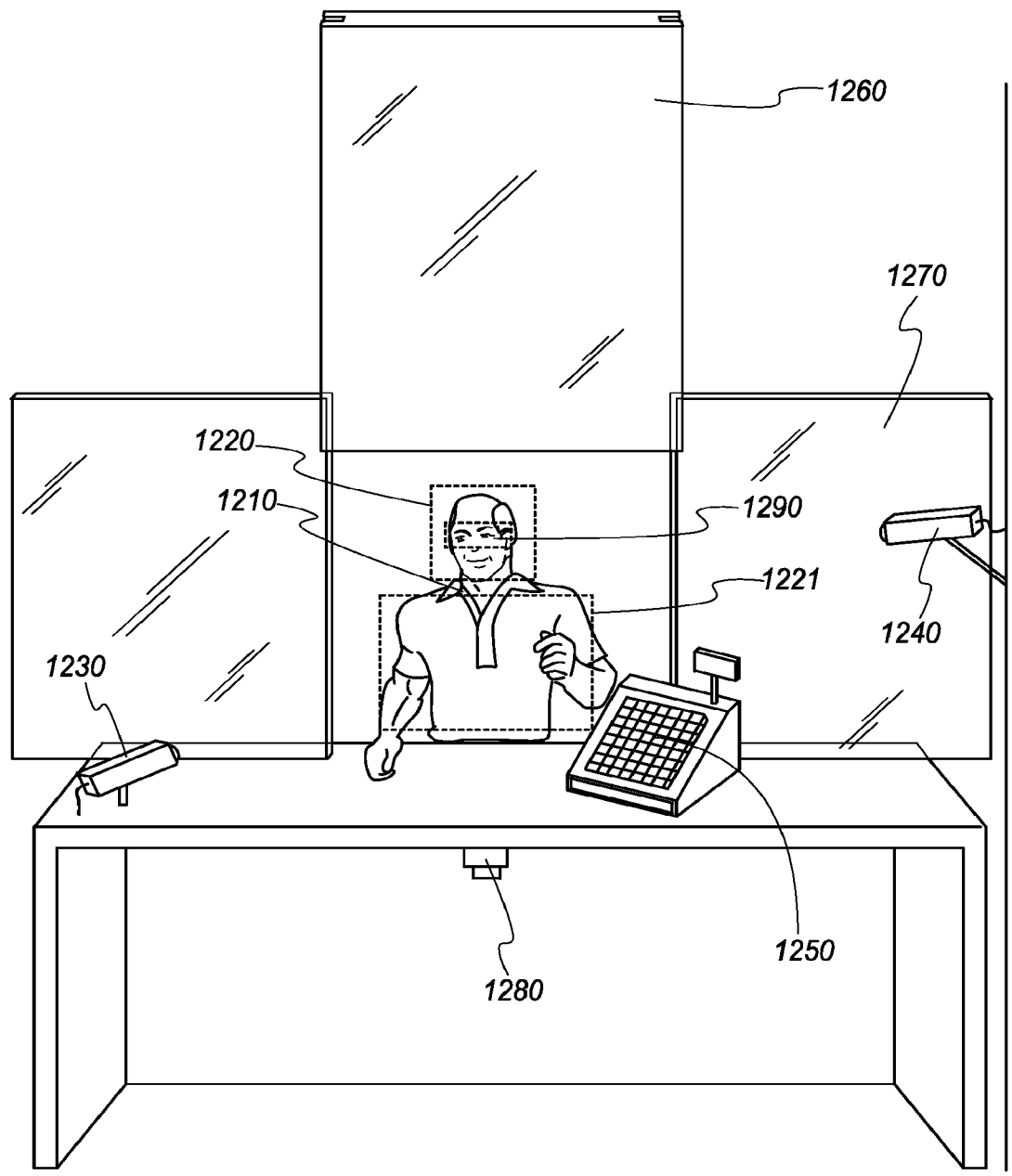
FIG. 15 is a perspective view of a typical indoor installation utilizing the non-lethal camera mounted dazzling device of FIGS. 13 & 14.

FIG. 15 depicts a perspective illustration of exemplary dazzler mounting locations. Cash box 1250 is placed in jeopardy by robber 1210. The cashier (not shown) actuates security alarm 1280. In an embodiment, the actuation of security alarm 1280 draws the attention of a remote monitoring service or console. The remote operator then operates dazzler 1230 and or 1240 by articulating the assembly to target area 1290 and triggering the dazzler, resulting in the hostile actor being stunned and temporarily neutralized, thus allowing security gate 1260 to be lowered, or the cashier time to reach safety. In an embodiment, dazzler assembly 1230 operates either autonomously or in conjunction with employee activated alarm 1280. In autonomous mode, the circuitry in dazzler assembly 1230 is constantly identifying patrons that appear in front of cashbox 1250. Using either onboard or remote artificial intelligence, dazzler 1230 assesses the threat level of person 1210 by analyzing the contents of area 1220 and 1221. Depending on predetermined instructions, dazzler assembly 1230 may trigger automatically or in conjunction with remote operator control or security alarm trigger 1280.

The assembly 1230 and 1240 includes a dazzling laser 900 (not shown). The dazzling laser can optionally be a low-power laser, such as a Class 3R laser diode with a power output of 4.78 mW, a wavelength of 650 nm (making it a red laser) and adapted to operate off of approximately 5V. Such a laser diode is readily available and provides the advantage of providing sufficient power for a reasonable range of 20 to 1000 yards, while not providing sufficient power to cause permanent damage to a hostile target's eyes. However, given that the output power is adjustable, a higher power output laser can be safely used as long as care is taken to ensure that only a safe power level for a particular range is used. For example, a 250-mW laser having a wavelength of 532 nm (making it a green laser) and adapted to operate off of 5V. Such laser diodes are readily available and provide the advantage of a far greater range exceeding 1000 yards. However, an adjustment mechanism must be used ensure that the power level that is directed at a hostile target's eyes is low enough to not cause permanent damage. A distance range in this value would be suitable for outdoor mounted assemblies to protect public venues from active shooters or other similar events.

Other components are required for the laser 900 to operate properly. In particular, a power source, such as batteries, and support circuitry, including voltage regulators, current sources, transistors, capacitors, and resistors can be required as well. As with the embodiment of FIG. 13, the dazzler may be operated remotely or via a push-button switch to activate the laser, and the switch can be mounted on top of the dazzler assembly 1000.

The embodiment of FIG. 15 is intended to provide a short and long range non-lethal dazzling. In particular, the dazzling device 1230 and 1240 of FIG. 15 can be operated by a user remotely or under autonomous control to activate the dazzling laser 900, resulting in the hostile actor being stunned and temporarily neutralized.

In particular, the embodiment of FIGS. 13, 14 and 15 integrates electronic circuitry to perform a number of functions. First, the embodiments integrate a range finder. A range finder is a device that typically operates in a non-visible spectrum, such as infrared. The range finder incorporates a transmitter; i.e., a laser diode, and a receiver, such as a silicon avalanche photodiode, or an InGaAs PIN avalanche photodiode (collectively referred to hereafter as a receiver). In an alternative embodiment the range finder may mathematically calculate the range to the target using video analysis, silhouette size comparison, interpupil distance or other techniques known in the arts. In an alternative embodiment, the range finder may be part of the dazzler assembly, or may be mounted in a co-operating location remote from the dazzler. The output of the receiver is coupled to a microcontroller or microprocessor (collectively referred to hereafter as "processor"), which then adjusts the power level of a coupled dazzling laser using, for example, a digitally controlled potentiometer, pulse width modulation, delta modulation, the manipulation of aperture size, lens adjustments, polarization plates, rapidly enabling and disabling the laser, bias control and other methods known in the art. In a further electronics based embodiment, a confirmation can be required prior to activation; i.e., the user would have to go through a range finding and activation stages as set forth herein to ensure that a hostile target's eyes were not exposed to a power level sufficient to cause permanent damage to the target's eyes. In addition, another feature that can be incorporated is the use of a facial recognition function that can inhibit the dazzle effect unless a person's head or face is recognized. Facial recognition may also be used when the dazzler is in a warning mode, wherein the dazzler is intentionally programmed to not target 1290, but deploy the laser on area 1220 to target the chest, arm, hand or similar area to alert the target that a dazzling countermeasure is in place. The dazzling laser in warning mode may also be deployed on cash box 1250 or any other area in the line of sight of a target such as robber 1210 to alert the target that countermeasures are in place. In addition, as discussed herein, video recording can also be incorporated. In addition, the target area size can be appreciably increased and the need for aiming accuracy decreased by incorporating laser scanning methods known in the art. In an embodiment, a diffraction grating is moved in front of the emitter. In another embodiment, galvanometers, electric motors or similar fine motion control can move the diffraction grating, mirrors, lensing or the laser diode with relation to a diffraction grating, mirrors or other mechanisms known in the art to allow the laser to scan a larger target area. When the dazzling system is in a warning mode, the laser scanning may take the form of written words or icons to alert the target that the area has active countermeasures in place. As an example, a 'do not enter' symbol may be projected onto the counter adjacent to cashbox 1250. In another embodiment, multiple emitters in a grid like pattern are mounted on a substrate that simultaneously or sequentially emit to increase the targeting beam area at the target. An example construction of 10000 laser emitters mounted in a 100×100 pattern that would cover an area of two feet by two feet at 20 yards would have the center lasers mounted at 90 degrees to the substrate and the outmost lasers mounted at 90+1.035 degrees offset to the centerline. Lasers approaching the center would be progressively less offset than 90+1.035 degrees until reaching the centerline of 90 degrees to the substrate. The mounting angle may be mixed or reversed from the above arrangement to allow for a variety of manufacturing techniques. A photolithographic process may have the devices angled in random locations, while a machined base may have regular angles as determined by standard machining processes. The substrate could also be edge emitting wherein the lasers are mounted on the substrate edge providing the necessary offset.

The potentially high-power output of the dazzling laser 100 allows the security device to be used at long ranges, such as more than 100 yards. In addition, the high-power output of the dazzling laser 900 can also be useful if countermeasures, such as special glasses, are used, or if the environment contains smoke or dust that would affect the received power level. In such a case, a high-power override can be incorporated, allowing the associated circuitry to compensate the power level. In an additional embodiment, the built-in optics and electronics may autodetect the presence of countermeasures or airborne contaminants and automatically adjust the power to a higher but still eye safe power level for the current environment or countermeasures.

Figure 16:
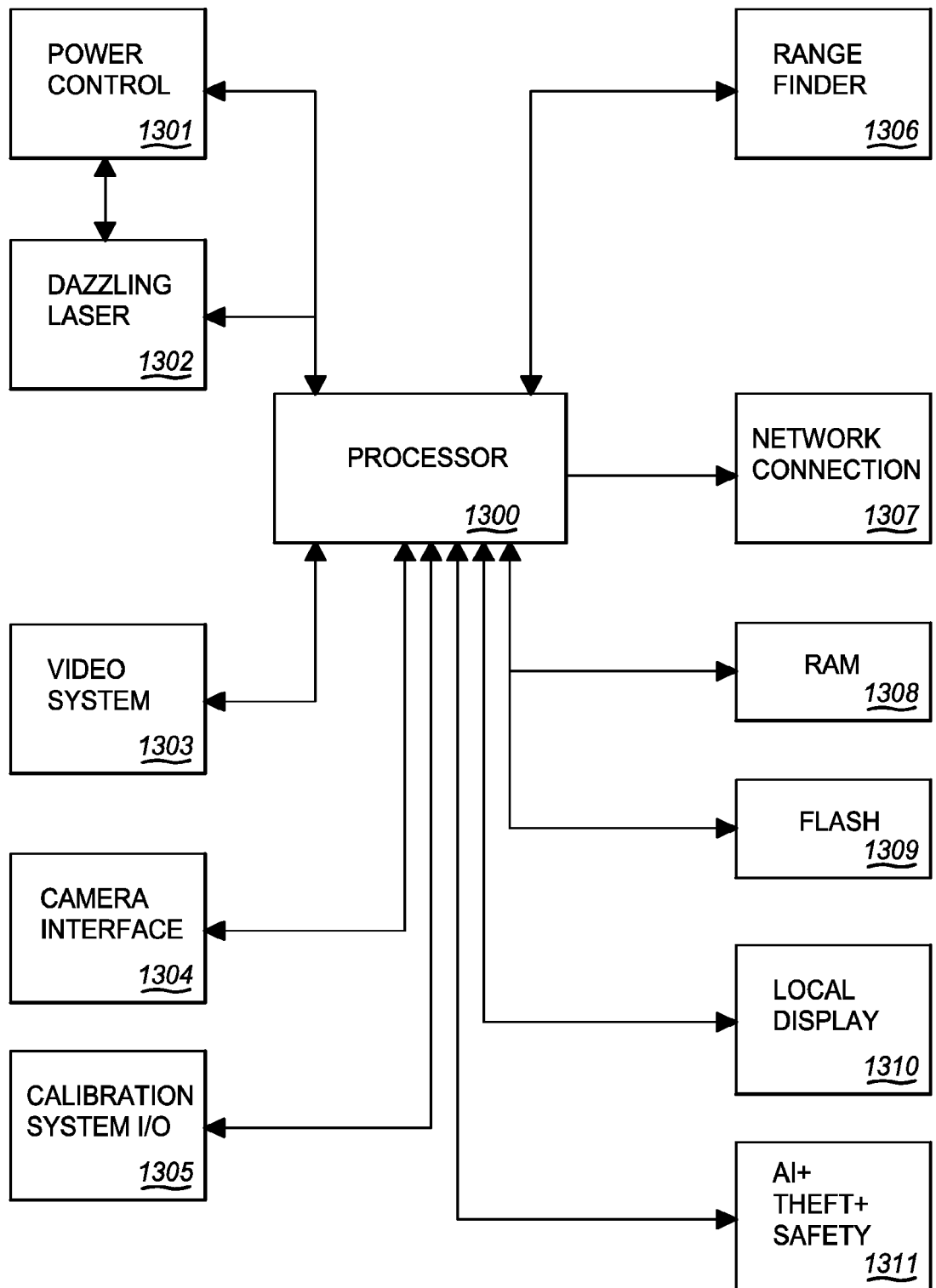
FIG. 16 is a simplified schematic block diagram of the circuitry depicted in FIG. 14.

Turning to FIG. 16, a simplified schematic diagram of a circuit for use with the non-lethal dazzling device 1000 is illustrated. In particular, main processor 1300 is coupled to communicate and receive feedback from power control circuit 1301. Communication between main processor 1300 and power control circuit 1301 may use commercial SPI (Serial Port Interface), I2C, RS488, or any unencrypted or encrypted suitable communication protocol. Power control circuit 1301 is bidirectionally coupled to dazzling laser 1302 and receives direct output feedback at dazzling laser 1302 via backscatter, partial reflection, transmission or other direct feedback measurement of the output laser. For example, feedback using a 5% partial reflection lens in the laser path would have 5% of the actual laser output being reflected to an on-board power meter. The circuitry and software would then be able to determine during laser emission the actual power being produced by the laser emitter, with 100% being emitted by the laser, 95% to the target, and 5% for measurement use. Power control circuit 1301 may also be factory calibrated at the laser using predetermined distances, temperatures and power levels using industry practices well known in the arts including linear, multi-linear, non-linear, higher-order polynomial and similar calibration techniques known in the arts. Example predetermined distances could include 1 cm, 10 cm, 1 meter, 10 meters, 100 meters, and 1000 meters.

The main processor 1300 is further coupled to video system 1303 that is used to gather images for further local or remote server-based processing of countermeasures, targeting assistance superimposed onto the user camera image, or separate video recording as desired. Further coupled to processor 1300 is camera interface 1304 that allows for the input from camera system 870 and superimposing assistance images onto the remotely viewable image such as targeting box 1220. Calibration system input/output 505 is used to communicate and program processor 1300 and Flash 1309 during the manufacturing and calibration process of dazzling system. The I/O system would communicate with external calibration devices (not shown) via USB, Bluetooth, 900 Mhz. or other remote communication channels such as IEEE488, RS232, ethernet, or other similar protocols.

Further coupled to processor 1300 is range finder 1306 as previously described. Network connection 1307 may be wired such as ethernet, or wireless protocols such as 802.x, LTE, 5G and the like to allow remote operator commands and data to be sent to the dazzler operator. Similarly, the network connection can allow for remote AI processors or monitors to allow for cloud-based processing of received images and remote AI processing and decision making. Further support circuitry such as RAM 1308, flash memory 1309, and a local display for diagnostics, aiming, or aligning with camera system 870 or other status functions may be included as desired. AI, anti-theft and safety module 1311 prevents dazzler operation if the device is moved from the predetermine geolocation without authorization. Safety and watchdog circuits monitor the device and prevent operation if the device is meddled with by unauthorized service personal, and the AI module provides local processing of target information up to and including fully automatic triggering of the dazzling system in communication with processor 1300 or after remote authorization.

Figure 17:
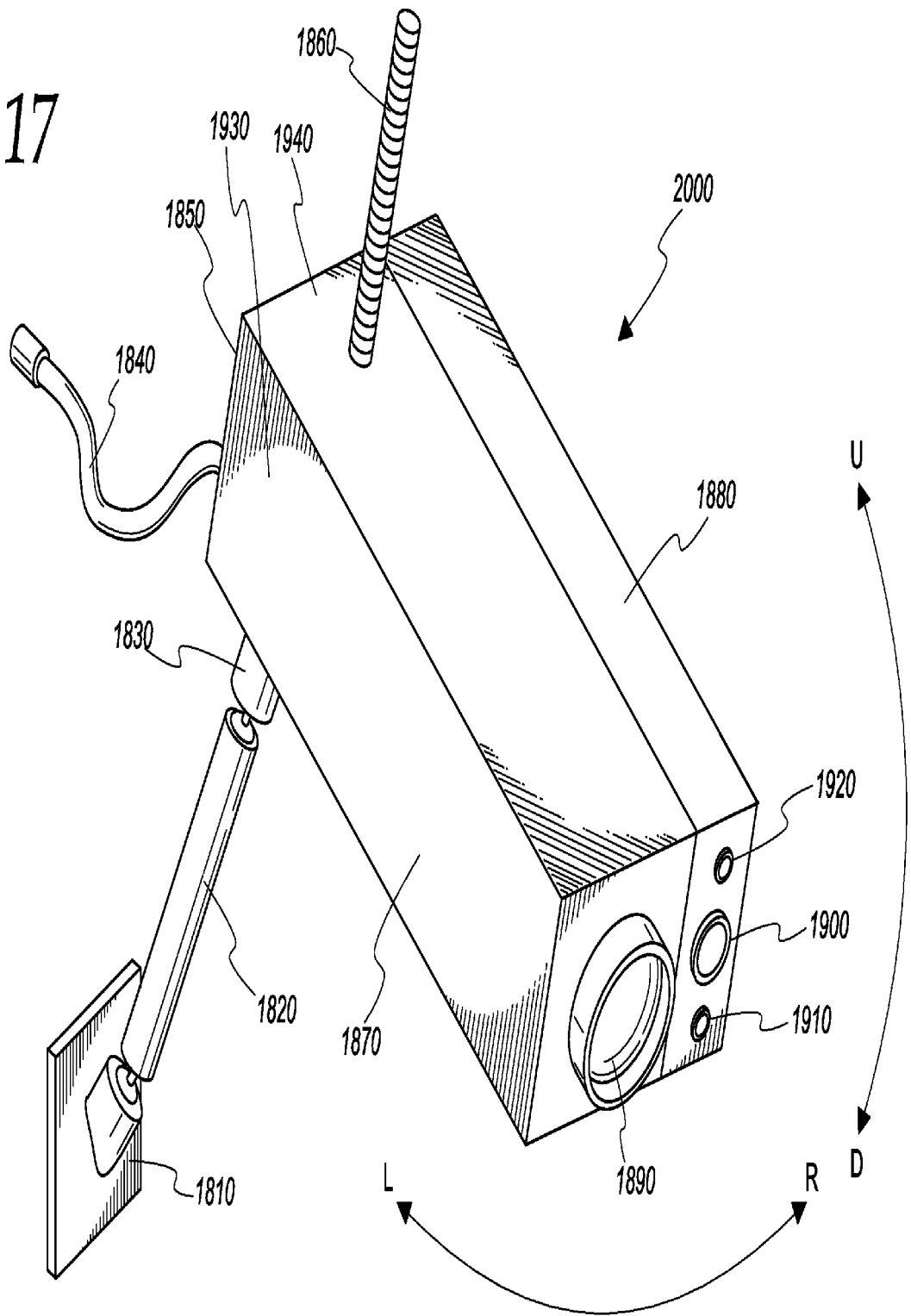
FIG. 17 is a perspective side-view of a non-lethal dazzling turret constructed in accordance with this disclosure.

Turning to FIG. 17, a perspective view of a non-lethal dazzling turret 2000 is depicted. As explained herein, the non-lethal dazzling turret 2000 can be remote-controlled or full autonomous. A first wall mount 1810 is joined to a mounting post 1820 to articulating mount 1830. The articulating mount 1830 is coupled to the non-lethal dazzling turret 2000. The non-lethal dazzling turret 2000 incorporates both a camera 1870 and a dazzler assembly 1880. The dazzler assembly 1880 comprises a dazzler emitter 1900 and an optical range finder 1920. It should be noted that the specific configuration of non-lethal dazzling turret 2000 shows the dazzler assembly 1890 mounted on the side of the camera 1870, but other configurations can also be utilized, including mounting independently motion controlled dazzler(s) completely independently of the camera assembly. The camera assembly 1870 includes a camera body 1850 and a camera lens assembly 1890.

The non-lethal dazzling turret 2000 can also utilize an antenna 1860 and/or a network cable 1840 to communicate with an external controller and monitor. The primary component of a dazzler assembly 1880 is a laser assembly (dazzler emitter) 1900. Such a laser assembly can have, for example, a maximum power output of 2.5 mW, a wavelength of 670 nm (nanometers), which would make it a red laser, and be adapted to operate on application of approximately 3V. Diodes with such specifications are readily available; in addition, lasers with similar specifications can be readily substituted. In particular, lasers with maximum power outputs of 5.0 mW and above are classified as Class 3B, which is capable of causing permanent damage to a person's eye even with a momentary exposure unless the output power is limited by support circuitry. Other support circuitry, such as, for example, one or more batteries, a voltage regulator, a microprocessor, a capacitor to handle current surges, and current regulating circuitry can all be used. However, other circuit configurations can be used to equal effect.

In addition, the laser assembly 1900 is coupled via electronic circuitry to range finder 1920 which help determines the distance to the target within an accuracy of say plus or minus one centimeter.

The articulating mount 1815 allows the non-lethal dazzling turret 2000 to articulate in three-dimensions through the use of a pair of motors. The articulating mount 1815 comprises a wall mount 1810, which includes a first motor (not shown) that controls the rotation of a mounting rod 1820. The mounting rod 1820 terminates at a swivel mount 1830 that includes a second motor (not shown).

Figure 18:
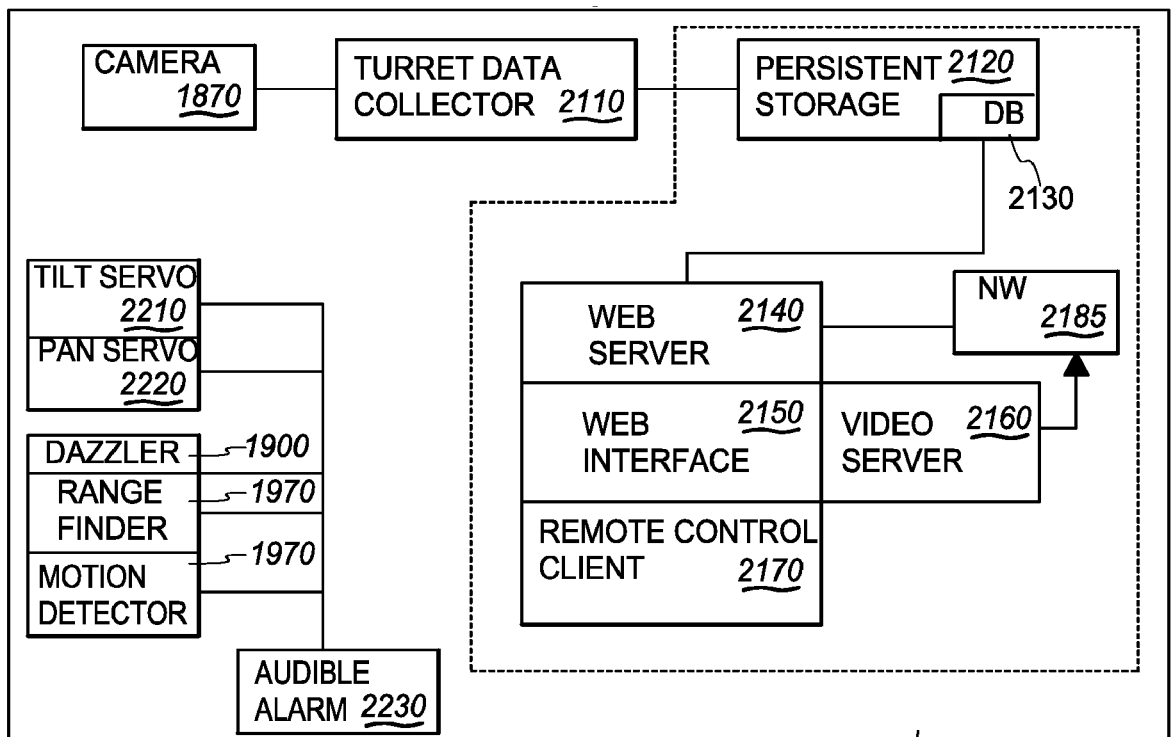
FIG. 18 is a simplified system block diagram illustrating the hardware and software components of a remote-controlled dazzling turret constructed in accordance with this disclosure.

Turning to FIG. 18, a simplified block diagram of the major hardware and software components of a remote-controlled embodiment of the non-lethal dazzling turret 2000 of FIG. 17 is shown. The software components operate on an on-board computer, or a combination of a microprocessor or microcontroller and sufficient random access and persistent storage. As depicted, the camera 1870, which acts as the eyes of the non-lethal dazzling turret 2000, sources data to the turret data collector 2110. The turret data collector 2110 provides a software buffer that collects data from the camera 1870. As depicted, the turret data collector 1870 collects data from a single camera 1870; however, it can collect data from multiple cameras in certain embodiments.

The turret data collector 2110 writes data to persistent storage 2120, which can be, for example, FLASH storage. For example, assuming that the camera 1870 sources video data at 1080p resolution, 1 TB of FLASH storage will allow the non-lethal dazzling turret 2000 to store hundreds of hours of video along with other required information; assuming that video is regularly collected from the non-lethal dazzling turret 2000 via the network cable 1840 or antenna 1860, such an amount of persistent storage should be more than sufficient. Local or web-based encryption and security may be used to protect any data stored locally or transmitted to a cloud system. The encryption method would assist in the secure maintenance of the chain of evidence should the information stored or transmitted by the dazzling system be needed a later time or date.

A database 2130 is used to organize the data that is collected by the non-lethal dazzling turret 2000. Database 2130 may be entirely contained within the dazzler assembly, entirely remote in on-site or cloud-based storage, or any combination of internal, on-site and cloud-based. In the case of the remote-controlled embodiment described herein, the data can include, for example, raw-video organized by time-stamp, as well potential target identifications identified by other software, as well as a log of turret controls from the remote-operator and a log of any time that the turret was fired.

A web server 2140 interfaces with the database 2130 and a network interface 2185. As explained earlier, the network interface 2185 can either be a wireless or wired interface as is called for in particular installation. A web interface 2150 provides an intermediate API that the video server 2160 and remote-control client 2170 can utilize.

The video server 2160 provides an encrypted or unencrypted streaming video interface via the network interface 2185 to a remote monitoring station (not shown). As explained later, the video server 2160 provides an environmental view of the target and a zoomed view of the target's face.

The remote-control client 2170 provides an encrypted or unencrypted interface allowing the remote operator to control the non-lethal dazzling turret 2000. In particular, the remote-control client 2170 interfaces with the dazzling laser 1900, the ranger finder 1920, an optional motion detector 1910, as well as a tilt servomotor 2210 and a pan servomotor 2220. In addition, the remote-control client 2170 may also control an audible alarm 2230, which activates whenever the laser is fired or being prepared to fire.

Figure 19:
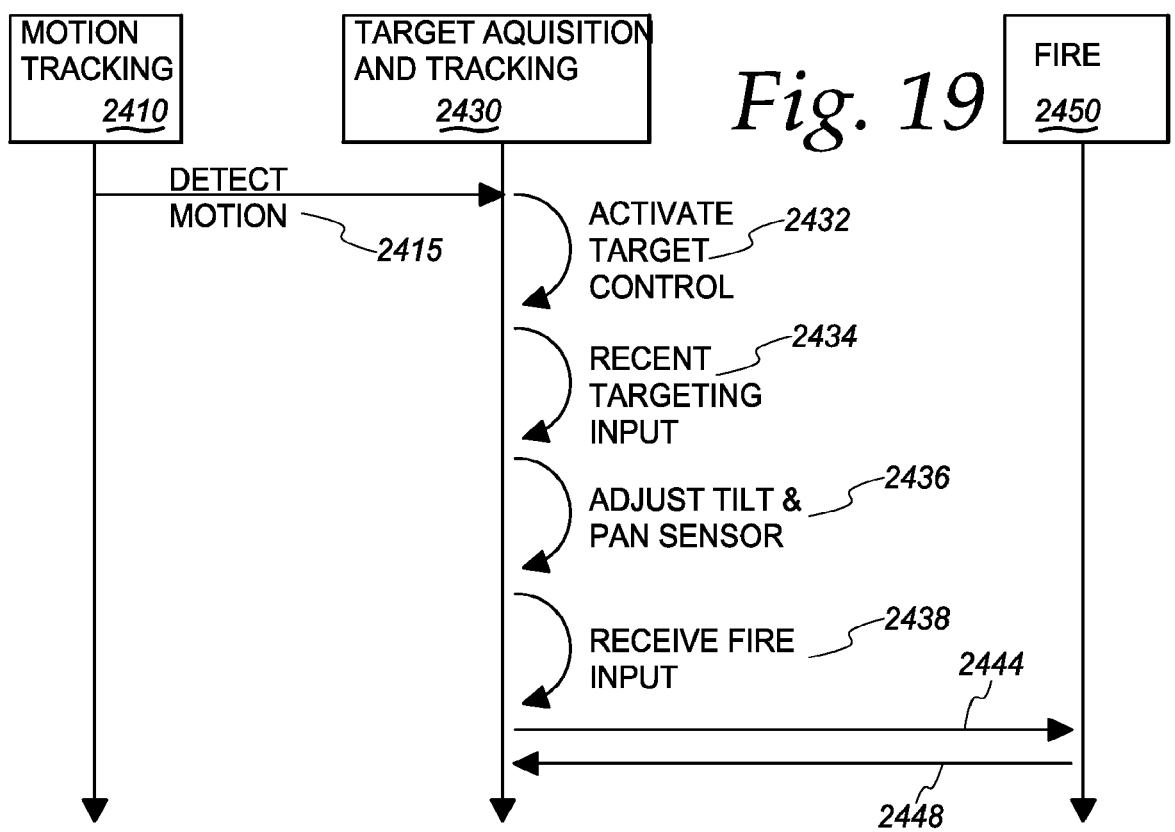
FIG. 19 is a simplified software activity diagram for use with the remote-controlled dazzling turret of FIG. 18.

Turning to FIG. 19, a simplified software activity diagram for software operating on the remote-controlled dazzling turret of FIGS. 17 and 18 is depicted. In typical operation the software will provide an indication as to whether the motion detector 1910 has detected a potential target. If so, the software will identify and track potential targets as well as accept inputs from a remote-monitor and respond to those inputs by controlling the servomotors. In addition, if a firing input is received the software activates the dazzling laser 1900. All inputs and activations of the dazzling laser 1900 are logged in the secure and or encrypted database 2130.

The software, which typically operates within the remote-control client 2170, includes a motion tracking module 2410. The motion tracking module 2410 can interface with an optional motion tracker 1910. In such a case, the motion tracker 1910 will trigger the operation target identification software, which will examine graphical data stored in persistent storage 2120 for several seconds before and after the trigger is received from the motion tracker 1910. Using techniques known in the art, motion from frame-to-frame is identified, and the subsection of each frame that is moving is compared with potential targets stored in the database 2130. For example, each frame can be divided into 64 rectangular sections, the pixels of which can be used to calculate a hash value, which can be compared with the hash value for the same section in the previous frame. The sections that identify a change in hash values from frame-to-frame can then be scanned to assemble a potential target based on a similarity comparison with a number of potential targets stored in the database.

Once a potential target is identified, a motion detected signal 2415 is generated and passed to the target acquisition and tracking module 2430. The target acquisition and tracking module is responsible for alerting the remote operator that a potential target is present and responding to commands from the remote-control client 2170 to reposition the non-lethal dazzling turret 2000. In particular, when a motion detected signal 2415 is received, the target acquisition and tracking module 2430 will perform an activate target controls routine 2432 for the remote monitor. In one embodiment, the activate target controls routine 2432 will generate graphical data to highlight the perceived target, as well as a cross hair or other identifying marks such as bounding boxes that will identify where the dazzling laser 1900 of the non-lethal dazzling turret 2000 is presently pointed. In addition, the activate target controls routine 2432 will create an entry in the databases 2130 indicating that a potential target has been identified. Inputs can further be received from the remote monitor via a receive targeting input routine 2434. Received inputs can include adjustments of the position of the non-lethal dazzling turret 2000, which are parsed into controls for the tilt servomotor 2210 or the pan servomotor 2220 and the sub-aiming system.

When appropriate inputs are received via the receive targeting input routine 2434, an adjust tilt and pan servomotor routine 2436 is activated. The adjust tilt and pan servomotor routine 2436 interfaces with the tilt servo 2210 and pan servo 2220 to reposition the non-lethal dazzling turret 2000 as well as database 2130 to log all such controls. In addition, a receive firing input routine 2438 detects whether the remote operator has indicated that the dazzling laser 1900 should be activated. If an input is received indicating that the dazzling laser 1900 should be activated, a fire signal 2444 is generated which activates the fire module 2450. The fire module 2450 activates the dazzling laser 1900 and logs the firing event in the database 2130. The dazzling laser 1900 can be activated for a predetermined time, such as 0.3 seconds, pulsed for a specific interval, such as 1 minute, or activated until a deactivation event is received. In addition, the firing module 2450 can also activate an audible alarm 2230, and potentially notify emergency services via the network interface 2185.

Figure 20:
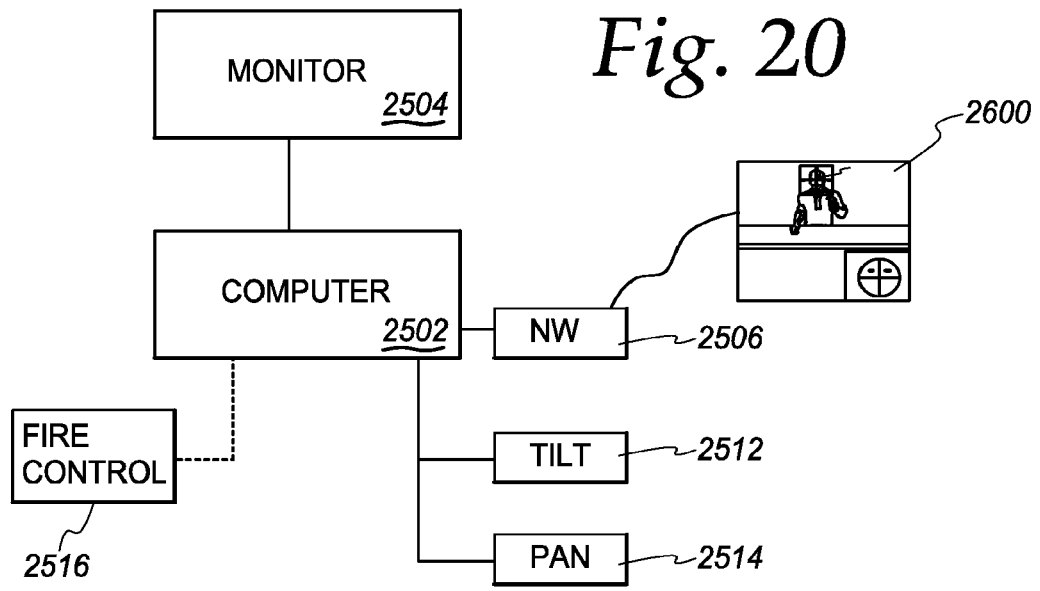
FIG. 20 is a simplified system for use by a remote monitor to monitor, target and fire the remote-controlled dazzling turret of FIG. 17.
Figure 21:
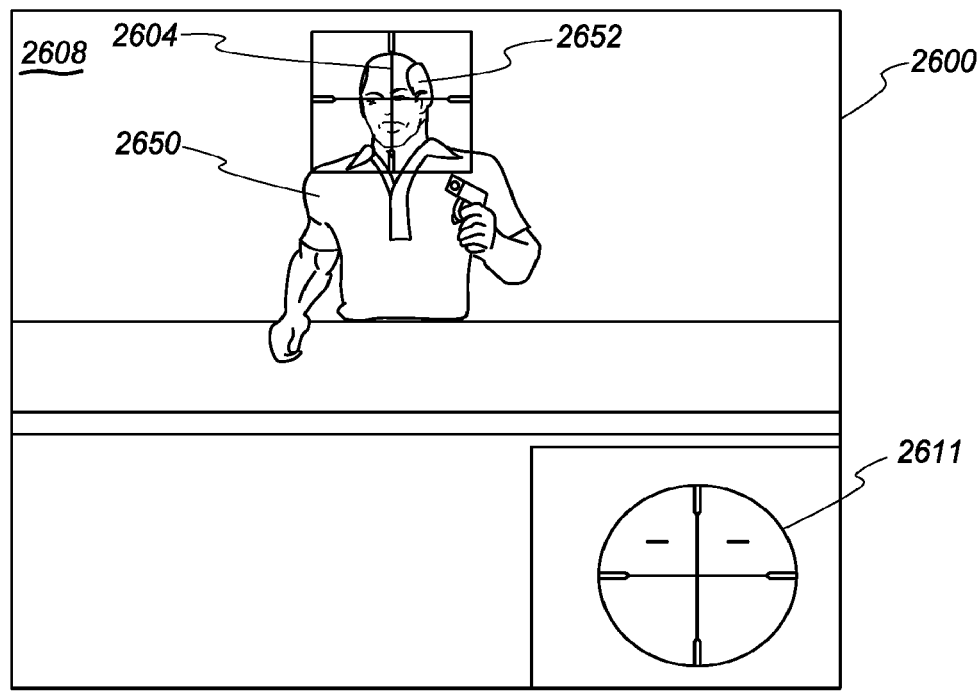
FIG. 21 is a screen view of a software interface for use by a remote monitor to monitor, target and fire the remote-controlled dazzling turret of FIG. 17.

Turning to FIGS. 20 and 21, a simplified block diagram of a standard remote monitoring setup is depicted. In particular, the remote monitoring setup includes a standard computer 2502 running remote monitoring software. The computer is coupled to a monitor 2504 which provides a heads-up display ("HUD") 2600 that allows an operator to visually monitor and control a non-lethal dazzling turret 2000 installation. The computer 2502 is further connected to a network port 2506 that connects to the Internet or another Wide Area Network to which the remote installation 2600 is also connected.

The computer 2502 includes a tilt control 2512, a pan control 2514, and a firing control 2516. For example, the computer 2502 can include a joystick (not shown), the movement of which will aim the camera (not shown) by moving the crosshair 2604 depicted in FIG. 21; i.e., the stick will operate both the tilt control 2512 and the pan control 2514. Similarly, a button mounted on the joystick can act as the fire control 2516. A track ball with a button control can also similarly be used; i.e., with the movement of the ball controlling both the tilt control 2512 and the pan control 2514, and the button acting as the fire control 2516. The tilt and pan controls may operate the camera tilt and pan, just the dazzler sub-aiming system or a combination of both aiming systems As shown the HUD 2600 includes a main viewing section 2608 and a zoomed viewing section 2611. The main viewing section depicts the view of the camera (not shown), which should be positioned in an advantageous position, such as behind a counter that a clerk is positioned at. When a hostile actor 2650 is identified as a potential target, the operator or software can position the crosshair 2604 so that the camera and dazzling laser is aimed at the hostile actor's head 2652. In particular, once the crosshair 2604 is approximately over the hostile actor's head 2652, the operator or automatic software can carefully position the dazzling laser using the zoomed view 2611 so that the laser is precisely aimed at the hostile actor's eyes. When properly aimed, the operator or automatic software can activate the fire control 2516 and temporarily dazzle the hostile actor 2650, giving store personnel time to act a security measure, run away, or call for help.

Figure 22:
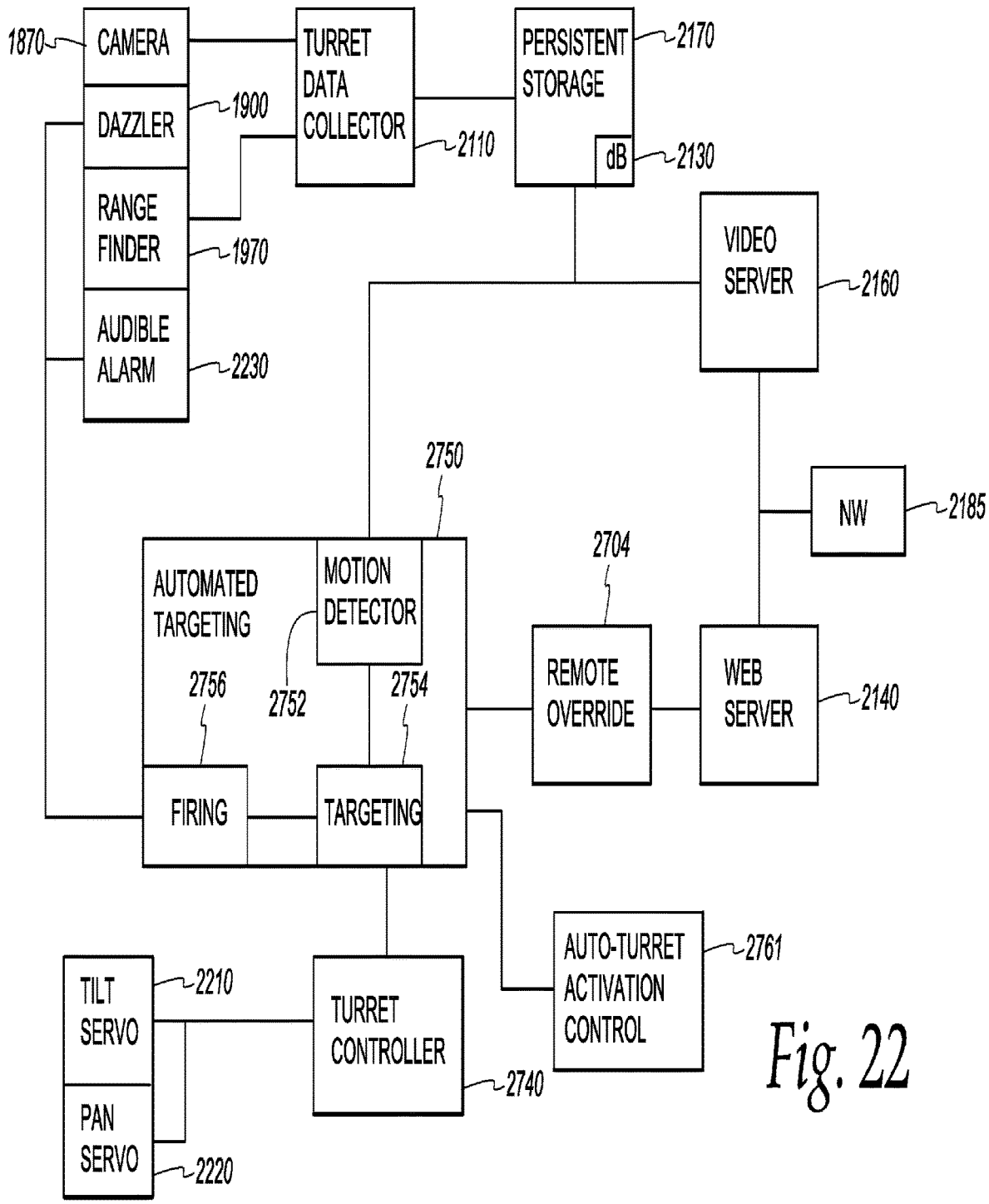
FIG. 22 is a simplified system block diagram illustrating the hardware and software components of a fully-autonomous dazzling turret constructed in accordance with this disclosure.

As explained earlier, the disclosed non-lethal dazzling turret 2000 can be either remote-controlled, as explained in the previous embodiment, or fully autonomous. Turning to FIG. 22, a simplified block diagram illustrating the major hardware and software components of a fully autonomous non-lethal dazzling turret is depicted. The software components operate on an on-board computer, or a combination of a microprocessor or microcontroller and sufficient random access and persistent storage. The fully autonomous non-lethal dazzling turret 2000 can operate in one of two modes. First, the non-lethal dazzling turret 2000 can be inactive, meaning that it will only serve video to a remote monitor and accept commands from the remote monitor. However, when in active mode, the non-lethal dazzling turret 2000 will automatically track and fire on any potential targets. A button 1280 for use by an on-site employee can move the non-lethal dazzling turret 2000 from inactive state to active state.

As depicted, the camera 1870, which acts as the eyes of the non-lethal dazzling turret 2000, sources data to the turret data collector 2110. The turret data collector 2110 provides a software buffer that collects encrypted or unencrypted data from the camera 1870. As depicted, the turret data collector 1870 collects data from a single camera 1870; however, it can collect data from multiple cameras in certain embodiments.

For example, in certain embodiments, multiple cameras can be used to image a particular area, so that the area can be completely covered. Alternatively, different cameras can be used to image different spaces, perhaps separated by portals, such as doorways, or aisles of a store. For the various embodiments described herein, various algorithms can be used to manage a handoff of an imaged actor from camera to camera. For example, the image space of each camera can be assigned a particular volume of space; i.e., a particular collection of voxels, and overlap and handoff can be managed by noting that a particular collection of voxels cannot be occupied by more than one person. Other means can also be used, and in particular, a number of means that are known in the art for managing the handoff of an actor from one camera to another are catalogued and described in "CAMERA HANDOFF: TRACKING IN MULTIPLE UNCALIBRATED STATIONARY CAMERAS," by Omar Javed and others of the Computer Vision Lab of the School of Electrical Engineering and Computer Science, of Orlando, Fla., which is hereby incorporated by reference in the entirety.

The turret data collector 2110 will directly write encrypted or unencrypted data to persistent data storage 2170, which can be in similar amount and form to that specified for the remote-controlled non-lethal dazzling turret described earlier. A video server 2160 can serve video directly from persistent storage 2170 to anyone that is remote monitoring the operation of the autonomous non-lethal dazzling turret via a network interface 2185. Similarly, a web server 2140 can provide updates and accept commands from a remote monitor via the network interface 2185. The web server 2140 interfaces with a remote override module 2704. The remote override module 2704 allows a remote operator to manually move the autonomous non-lethal dazzling turret 2000 from an active state to an inactive state or vice versa. When in the inactive state, the non-lethal dazzling turret 2000 will not track and fire on targets.

A database 2130 is used to organize the data that is collected by the non-lethal dazzling turret 2000. In the case of the remote-controlled embodiment described herein, the data can include, for example, raw-video organized by time-stamp, as well potential target identifications identified by other software, as well as a log of autonomous turret operations, including target identifications, aiming operations, and firing operations. The log files may be structured to comply with chain of evidence requirements including security, encryption, non-eraseability, non-modifiability and other evidence tampering protections as required by code or law.

An automated targeting module 2750 also pulls video data from persistent storage 2120 and or camera 1870. Automated targeting module 2750 or components thereof may be contained in dazzling turret 2000, adjacent to, or entirely remote to dazzling turret 2000 or in conjuction with auto-turret activation control 2761. The automated targeting module 2750 includes a motion detection module 2752. The motion detection module 2752 scans each frame of video and compares it with prior frames to identify motion as well as potential targets. The potential targets are passed onto a targeting module 2754 and are also logged in the database 2130. The targeting module 2754 is responsible for tracking targets and aiming the dazzling laser 1900. The targeting module 2754 provides aiming inputs to the turret controller module 2740. In addition, the targeting module 2754 will provide a fire on target signal to the firing module 2756, which is responsible for actually firing the dazzling laser 1900 and activating the audible alarm 2230. The targeting module 2754 will also log any aiming movements in the database 2130. The firing module 2756 will log any instances that the dazzling laser 1900 is actually activated as well as the approximate range to the target and the power and duration of the dazzling laser 1900 activation.

A laser ranger finder 1970 further provides range data for the identified target to the firing module 2756 and targeting module 2754. The targeting module 2754 tracks the range of acquired targets and passes the same onto the firing module 2756 when a fire on target signal is generated. The firing module 2756 uses the range to the target from the ranger finder 1920 to adjust the power of the dazzling laser 1900 or to adjust the duration for which the dazzling laser 1900 is activated.

The turret controller 2740 adjusts targeting inputs from the targeting module 2754 with commands to tilt servo motor 2210 and or pan servo motor 2220, and optionally the sub-aiming system, thereby allowing the non-lethal dazzling system to be aimed at the target. Auto-turret activation control 2761 may use remote or onboard artificial intelligence software or firmware to recognize and categorize a wide range of threats scenarios including, posture, pulse rate, IR emission, shown or hidden weapons, metal detection, identity in a crime database or other factors to make a threat assessment and a dazzler emission from dazzler assembly to provide further control input to turret controller 2740.

Figure 23:
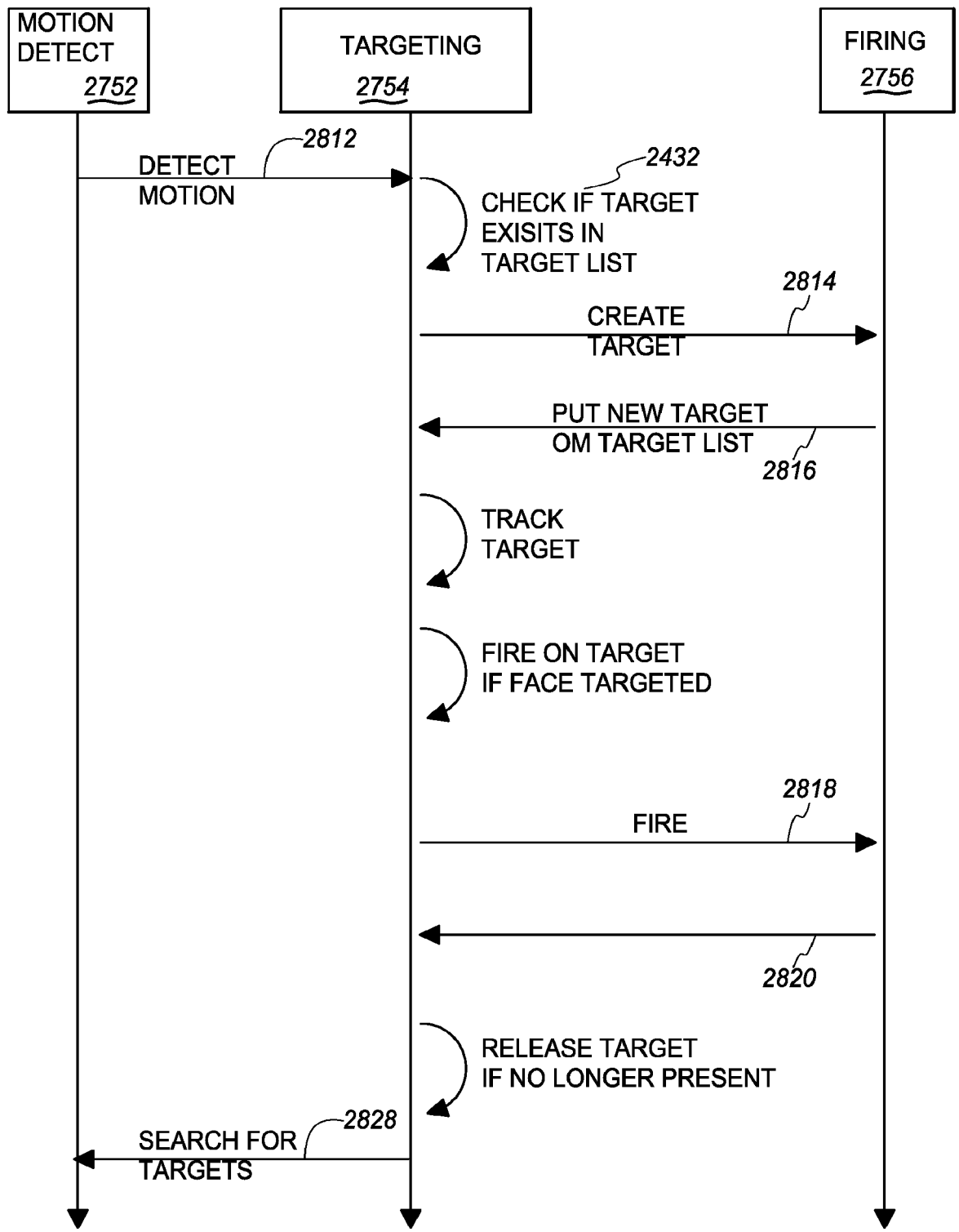
FIG. 23 is a simplified software activity diagram for use with the fully-autonomous dazzling turret of FIG. 22.

Turning to FIG. 23, a simplified software activity diagram for software operating on the remote-controlled dazzling turret of FIGS. 17 and 23 is depicted. In typical operation the motion tracking module 2752 will provide an indication as to whether a potential target has been detected by generating a detected motion signal 2812. The targeting module 2754 will receive the detect motion signal 2812, and will check to determine if a potential target exists in its target list. If the identified target does not exist in the targeting list of the targeting module 2754 a create target signal 2814 is generated and sent to the firing module 2756. The firing module is responsible for creating targets and generating a put new target in target list signal 2816, which is passed to the targeting module 2754. The targeting module 2754 will then track the target and generate any targeting adjustments needed to aim the non-lethal dazzling turret 2000 at the target's face. The targeting module 2754 will communicate any required targeting adjustments to the turret control 2740.

Once the targeting module 2754 verifies that the target's face is targeted a fire signal 2818 is generated and sent to the firing module 2756. The firing module 2756 will then fire the dazzling laser 1900 at an appropriate power level and duration so as to dazzle the target but not permanently damage the target's eyes. After the dazzling laser 1900 has been fired the firing module 2756 will generate a return signal 2820 that will signal the targeting module 2754 to continue targeting operations. The targeting module will then check if the target is no longer present, and if so, it will be released from the target list. If no target is present, a search for targets 2822 signal is generated activating the motion detection module 2752.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. It should also be noted that a variety of the features discussed herein. may be combined with other features discussed herein. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A non-lethal dazzling device comprising:
   a housing;
   a dazzling module, the dazzling module comprising:
      a laser drive circuit;
      a firing control operatively coupled to the laser drive circuit whereby the laser drive circuit is actuated by activation of the firing control and produces a laser drive power;
      a dazzling laser coupled to and driven by the laser drive circuit, whereby the dazzling laser produces a beam proportional to the laser drive power;
      an aiming system coupled to a camera whereby the aiming system positions the dazzling laser at the target;
      a range-finding system whereby the distance to the target is determined; and
      verifying the output of the dazzling laser at the dazzling laser.

2. The non-lethal dazzling device of claim 1 wherein the potential target does not include the eyes of the target.

3. The non-lethal dazzling device of claim 1 further comprising:
   a computer coupled to the camera;
   wherein the camera is adapted to generate a stream of video, the stream of video including a plurality of sequential frames;
   the computer being adapted to execute software, the software being adapted to a) analyze successive video frames for motion and b) identify a potential target based on changes in successive video frames.

4. The non-lethal dazzling device of claim 1 further comprising:
   at least one motion control coupled to the housing;
   wherein the housing has a facing in-line with the camera and wherein the at-least one motion control is adapted to adjust the facing of the non-lethal dazzling device.

5. The non-lethal dazzling device of claim 1 wherein the at least one motion control includes a tilt servomotor adapted to control the tilt of the housing and a pan servomotor adapted to control the pan of the housing.

6. The non-lethal dazzling device of claim 4 further comprising:
   at least one network port coupled to the dazzling module;
   the network port being further adapted to c) serve video to a remote installation, and d) accept commands from the remote installation, the commands being adapted to operate the at least one motion control to adjust the facing of the dazzler.

7. The non-lethal dazzling device of claim 6 wherein the software is further adapted to accept a firing command from the remote operator, and on acceptance of the firing command, the software is adapted to activate the firing control.

8. The non-lethal dazzling device of claim 1 wherein the camera is adapted to generate a stream of video, the stream of video including a plurality of frames and wherein the non-lethal dazzling device further comprises:
   persistent storage coupled to a computer, the persistent storage being adapted to receive the stream of video and store frames of video;
   the software on the computer further comprising a targeting module, the targeting module being adapted to visually identify the potential target based on changes in the frames of video; and
   the software on the computer further comprising a firing module, the firing module being adapted to activate the firing control.

9. The non-lethal dazzling device of claim 8 further comprising:
   an activation control, the activation control being adapted to disable the firing module.

10. The non-lethal dazzling device of claim 8 further comprising:
the range finding system being adapted to determine range information and write the range information to the persistent storage, the range information being indicative of the range to the potential target;
an on-board computer, wherein the on-board processor is further adapted to adjust the power level of the laser drive circuit based on the range information.

11. The non-lethal dazzling device of claim 10 further comprising:
the range finder being adapted to write encrypted range information to the persistent storage, the encrypted range information being indicative of the range to the potential target.

12. The non-lethal dazzling device of claim 10 further comprising:
the range finder being adapted to write un-erasable range information to the persistent storage, the Lin-erasable range information being indicative of the range to the potential target.

13. The non-lethal dazzling device of claim 10 further comprising:
the range finder being adapted to write encrypted range information to remote encrypted persistent storage.

14. The non-lethal dazzling device of claim 4 wherein the aiming system moves the camera and dazzler assembly together.

15. The non-lethal dazzling device of claim 4 wherein the aiming system moves the dazzler assembly independently of the camera.

16. The non-lethal dazzling device of claim 4 wherein the aiming system is adapted to generate an aiming point indicative of an optimal location to discharge the dazzler to dazzle the target and wherein the aiming system moves the aiming point independently of the dazzling module.

17. An automated non-lethal dazzling device comprising:
a housing;
a dazzling module, the dazzling module comprising:
a laser drive circuit;
a firing control operatively coupled to the laser drive circuit whereby the laser drive circuit is activated by activation of the firing control and produces a laser drive power;
a dazzling laser coupled to and driven by the laser drive circuit, whereby the dazzling laser produces a beam proportional to the laser drive power;
a camera, the camera generating a stream of video, the stream of video including a plurality of sequential frames;
a computer coupled to the camera;
the computer being adapted to execute software, the software being adapted to a) analyze successive video frames and b) identify a potential target;
the computer being coupled to the firing control and being further adapted to operate the firing control to dazzle the potential target.

18. The non-lethal dazzling device of claim 17 wherein the potential target does not include the eyes of the target.

19. An automated non-lethal dazzling device comprising:
a dazzling module, the dazzling module comprising;
a laser drive circuit;
a firing control operatively coupled to the laser drive circuit whereby the laser drive circuit is activated by activation of the firing control and produces a laser drive power;
a dazzling laser coupled to and driven by the laser drive circuit, whereby the dazzling laser produces a beam proportional to the laser drive power;
at least two cameras, the cameras generating frames of video;
a computer coupled to at least one camera;
the computer being adapted to execute software, the software being adapted to a) analyze at least some of the frames of video and h) identify a potential target;
tracking the target across the at least two frames of video.

20. The non-lethal dazzling device of claim 1 wherein the laser drive circuit is contained within the housing of the non-lethal dazzling device.

21. The non-lethal dazzling device of claim 17 wherein the dazzling laser is contained within the housing of the non-lethal dazzling device.

22. The non-lethal dazzling device of claim 19 wherein the potential target does not include the eyes of the target.

* * * * *